(12) United States Patent
Yamada

(10) Patent No.: US 7,654,568 B2
(45) Date of Patent: Feb. 2, 2010

(54) AIRBAG FOR A FRONT PASSENGER'S SEAT

(75) Inventor: Ikuo Yamada, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/230,795

(22) Filed: Sep. 4, 2008

(65) Prior Publication Data

US 2009/0058056 A1 Mar. 5, 2009

(30) Foreign Application Priority Data

Sep. 5, 2007 (JP) ............................. 2007-230456

(51) Int. Cl.
*B60R 21/16* (2006.01)
(52) U.S. Cl. .................. 280/743.1; 280/731; 280/743.2
(58) Field of Classification Search ............. 280/728.2, 280/730.1, 731, 732, 743.1, 743.2, 739
See application file for complete search history.

(56) References Cited

U.S. PATENT DOCUMENTS

| 6,834,886 B2 * | 12/2004 | Hasebe et al. ............. 280/743.1 |
| 7,000,943 B2 * | 2/2006 | Hasebe et al. ............. 280/729 |
| 7,108,282 B2 * | 9/2006 | Hasebe et al. ............. 280/743.1 |
| 7,316,416 B2 * | 1/2008 | Hasebe et al. ............. 280/729 |
| 7,360,789 B2 * | 4/2008 | Bito ......................... 280/743.1 |
| 7,370,880 B2 * | 5/2008 | Hasebe ....................... 280/729 |
| 7,455,317 B2 * | 11/2008 | Bito ........................... 280/732 |
| 7,458,605 B2 * | 12/2008 | Hasebe et al. ............. 280/729 |
| 7,487,994 B2 * | 2/2009 | Okada et al. ............... 280/732 |
| 2003/0030254 A1 * | 2/2003 | Hasebe ....................... 280/729 |
| 2003/0218325 A1 * | 11/2003 | Hasebe et al. ............. 280/743.2 |
| 2003/0230883 A1 * | 12/2003 | Heym ........................ 280/743.1 |

FOREIGN PATENT DOCUMENTS

JP A-2004-502585 1/2004
JP A-2006-103654 4/2006

* cited by examiner

*Primary Examiner*—Toan C To
(74) *Attorney, Agent, or Firm*—Posz Law Group, PLC

(57) ABSTRACT

An airbag for a front passenger's seat internally includes a communication port defined by an inner joint that joins inner circumferential edges of a pair of inner panels. The airbag includes at a rear side a recess and a pair of raised regions. The airbag further includes a contact portion where outer surfaces of the inner panels are in face-to-face contact proximate the circumference of the communication port at full inflation. The contact portion is created and maintained by an inner pressure of the airbag at full inflation that acts on the panels of the airbag, and is not formed if the inner pressure is less than that at full inflation of the airbag.

7 Claims, 23 Drawing Sheets

AIRBAG FOR A FRONT PASSENGER'S SEAT

The present application claims priority from Japanese Patent Application No. 2007-230456 of Yamada, filed on Sep. 5, 2007, the disclosure of which is hereby incorporated into the present application by reference.

BACKGROUND OF THE INVENTION

1. Field of the Invention

The present invention relates to an airbag for a front passenger's seat of vehicle that is mounted on a top area of an instrument panel in front of a front passenger's seat and is deployable upward and rearward in such a manner as to fill in a space between the top of the instrument panel and a windshield.

2. Description of Related Art

As known in JP 2006-103654, for example, a conventional airbag for a front passenger's seat is made by joining a pair of outer panels that constitute laterals of the airbag and a pair of generally C-shaped inner panels that are located in an inner area in the transverse direction of the airbag such that it inflates into a generally square conical shape whose front end is the top of the square cone. The airbag internally includes at a center in the transverse direction at full inflation a communication port defined by an inner joint that joins inner circumferential edges of the inner panels together. The airbag includes at least on a rear area corresponding to the circumferential edge of the communication port at full inflation a recess that recesses forward and a pair of raised regions that project rearward relative to the recess on the left and right of the recess and each extend generally vertically. In operation, when a vehicle occupant contacts the airbag, the airbag firstly arrests shoulders of the occupant by the raised regions and then softly receives a head of the occupant whose kinetic energy has been reduced by the arrest of the shoulders by the recess.

The above conventional airbag still have a room for improvement especially in the protection of an occupant seated excessively proximate the dashboard (known as an Out-of-Position occupant) because there is a potential risk that an area of the airbag around the communication port may contact and unduly press such occupant before the raised regions deploy enough rearward to arrest his/her shoulders.

JP 2004-502585 discloses an airbag designed to reduce a risk to the Out-of-Position occupant. The airbag includes at a center in the transverse direction of the rear side at full inflation a recess that recesses forward and a pair of raised regions located on the left and right of the recess. The raised regions separate from each other in an opening manner when contacting an Out-of-Position occupant such that the recess receives the occupant between the raised regions.

However, the raised regions must be kept contacting each other if the airbag is used to protect an occupant seated at a normal position. The above airbag includes means for keeping the raised regions closed such as a wrapping member, but this means complicates the structure of the airbag.

SUMMARY OF THE INVENTION

The object of the present invention is to provide an airbag for a front passenger's seat that, with a simple structure, inhibits a risk of applying an undue pressure to an occupant seated excessively proximate the dashboard upon deployment while at the same time is capable of protecting an occupant seated in a normal position properly.

The object of the present invention is attained by an airbag having the following structure:

An airbag for a front passenger's seat is mountable on a motor vehicle. The airbag is folded up and stored in a housing on a top area of an instrument panel in front of the front passenger's seat for deployment upward and rearward when fed with inflation gas in such a manner as to fill in a space between a top plane of the instrument panel and a windshield disposed above the instrument panel. The airbag has a generally square conical contour at inflation whose front end is the top of the square cone and includes:

a pair of outer panels located on laterals of the inflated airbag;

a pair of inner panels located on an inner area in a transverse direction of the inflated airbag, each of the inner panels having a band contour curved in a generally C-shape as is flattened;

an inner joint that joins inner circumferential edges of the inner panels together;

a gas inlet for introducing inflation gas, at the vicinity of a lateral center of a front end of a lower side of the airbag at full inflation;

a communication port located at a center in a transverse direction of an interior of the airbag at full inflation, a circumferential edge of the communication port being defined by the inner joint;

a recess that recesses forward at a region corresponding to the circumferential edge of the communication port on at least a rear part of the airbag at full inflation;

two raised regions located on left and right of the recess, each of the raised regions extending generally vertically in such a manner as to rise rearward relative to the recess; and a contact portion where outer surfaces of the inner panels are in a face-to-face contact. The contact portion is created and maintained proximate the circumferential edge of the communication port by an inner pressure of the airbag at full inflation that acts on the outer panels and inner panels, and is not formed if the inner pressure is less than that at full inflation of the airbag.

When fully inflated, the above airbag of the invention includes the contact portion where outer surfaces of the inner panels are in a face-to-face contact, proximate the circumferential edge of the communication port located at the lateral center. The contact portion makes the communication port relatively small and helps prevent an area around the communication port from engaging a vehicle occupant during airbag deployment even in the event that the occupant is seated excessively proximate the dashboard. Moreover, since the contact portion is not formed in the initial stage of airbag inflation, the raised regions deploy in such a manner as to unfurl to the left and right. That is, in the initial stage of airbag deployment, an inflation gas entered from the gas inlet flows to the left and right raised regions via the communication port, so that the airbag unfurls vertically and transversely but not toward an occupant. Furthermore, since the communication port has a small diameter, the area around the communication port has a relatively small projecting stroke in the initial stage of airbag inflation and therefore has a low pressing stroke against the occupant even in the event that the inflating airbag engages the occupant seated excessively proximate the dashboard. As a result, the airbag has a reduced risk of unduly pushing such occupant rearward coupled with the manner the airbag unfurls widely in the vertical and transverse directions.

Since the airbag of the invention is configured such that the contact portion is created and maintained by the inner pressure of the airbag at full inflation that acts on the panels of the airbag, when the airbag is used to protect an occupant seated at a normal position, the airbag passes through the early stage of deployment where the contact portion is not formed and completes inflation with the outer surfaces of the inner panels brought into face-to-face contact to form the contact portion. Presumptively the contact portion is created proximate the inner joint that joins the inner circumferential edges together at full airbag inflation by designing the inner circumferential edges of the inner panels such that an area encircled by the inner circumferential edge (or an area of the communication port) is reduced. If an occupant is thrown against the airbag having the contact portion, the raised regions firstly receive left and right shoulders of the occupant and thereby reducing a kinetic energy of the occupant. Then the airbag receives an occupant's head softly by the recess in such condition that his/her kinetic energy has been preliminarily reduced by the raised regions.

Therefore, the airbag of the invention, with a simple structure, inhibits a risk of applying an undue pressure to an occupant seated excessively proximate the dashboard upon deployment while at the same time being capable of protecting an occupant seated in a normal position properly.

If the inner circumferential edges of the inner panels of the above airbag is configured to each include a straight portion such that the contact potion is formed into a generally crescentic shape having the straight portion as a chord thereof, a distance between the straight portion or the inner circumference and the curved outer circumference, of the contact portion, is enlarged, i.e., the contact portion is configured deep. Therefore, the rearward projecting stroke of the area around the communication port is further reduced in the initial stage of airbag deployment while at a later stage of deployment the airbag is able to complete inflation having the contact portion and making the raised regions come close to each other so the raised regions arrest occupant's shoulders securely.

If the above airbag is configured such that the contact portion is formed proximate an upper part of the circumferential edge of the communication port, the area around the communication port is securely prevented from engaging a head of such an occupant as seated excessively proximate the dashboard upon airbag deployment. If the airbag deploys when an occupant is seated at a normal position, his/her shoulders are firstly arrested by the raised portions and then his/her head enters into the recess. Then the airbag starts to arrest the head at the outer circumference of the contact portion. As the head intrudes further into the recess, the contact portion dissolves and allows the head to enter into the area of the contact portion. That is, the airbag as fully inflated comes to have a substantially deepened recess, and therefore is able to protect the occupant's head further softly. Since the airbag starts to arrest the head at the outer circumference of the contact portion, although the depth of the recess is great, the timing to arrest the head is not late in comparison with conventional airbags, thereby assuring proper protection of an occupant's head.

In the above airbag for a front passenger's seat, it is desired that:

the outer panels are configured into such laterally symmetric separate entities that split up an area of the airbag as inflating except a rear part;

the airbag includes a joint that joins upper edges of the outer panels, the joint extending along an anteroposterior direction at a center in the transverse direction of an upper area of the airbag at full inflation;

the inner panels are configured such that a front end of each of the inner circumferential edges thereof and a front end of each of the outer circumferential edges thereof coincide each other while at the same time a curvature of the outer circumferential edges thereof is generally congruent with a curvature of the outer circumferential edges of the outer panels;

each of the inner circumferential edges of the inner panels that form an inner circumference of the contact portion includes a straight portion; and each of the straight portions extends rearward from the front end of each of the inner circumferential edges.

With this configuration, since the inner panels are configured such that the front end of each of their inner circumferential edges and the front end of each of their outer circumferential edges coincide each other while at the same time the curvature of their outer circumferential edges are generally congruent with that of the outer circumferential edges of the outer panels, the bottom of the recess which is formed of the inner joint and the tops of the raised regions which are formed of joints of the outer circumferential edges of the inner panels and outer panels start from the same leading ends. Furthermore, since the straight portions forming the inner circumference of the contact portion extends rearward from the front end of each of the inner circumferential edges, a leading end of the contact potion also comes to coincide with the leading ends of the tops of the raised regions at full inflation of the airbag. The leading end of the contact potion and the leading ends of the tops of the raised regions are located proximate an area of the fully inflated airbag that contacts the windshield, so that the contact portion itself is formed on other area of the airbag that is out of contact with the windshield. As a result, the contact portion is formed in a stable manner without being affected by the windshield or raised regions.

Moreover, the airbag may be configured to have the contact portion proximate a lower part of the circumferential edge of the communication port. If the airbag thus configured operates for example in the event that a child seat is mounted facing rearward on a front passenger's seat, the contact portion of the fully inflated airbag will dissolve and receive a head rest part of the child seat in between the recess and the dashboard, so that the inflated airbag will be prevented from engaging the child seat as much as possible. In the event that not only a child seat but also other objects are located proximate the dashboard, too, the airbag will be prevented from engaging those objects at full inflation as much as possible.

If the above airbag is alternatively configured such that an outer circumference of the contact portion so curves that a center thereof projects rearward at full inflation of the airbag and each of the inner circumferential edges of the inner panels that form the inner circumference of the contact portion includes a curved portion that projects toward the gas inlet at full inflation of the airbag relative to a hypothetical chord connecting opposite ends of the outer circumference of the contact portion, the contact portion will be enlarged by an area encircled by the curved portion. That is, the recess of the airbag is substantially deepened.

BRIEF DESCRIPTIONS OF DRAWINGS

Figure 1:
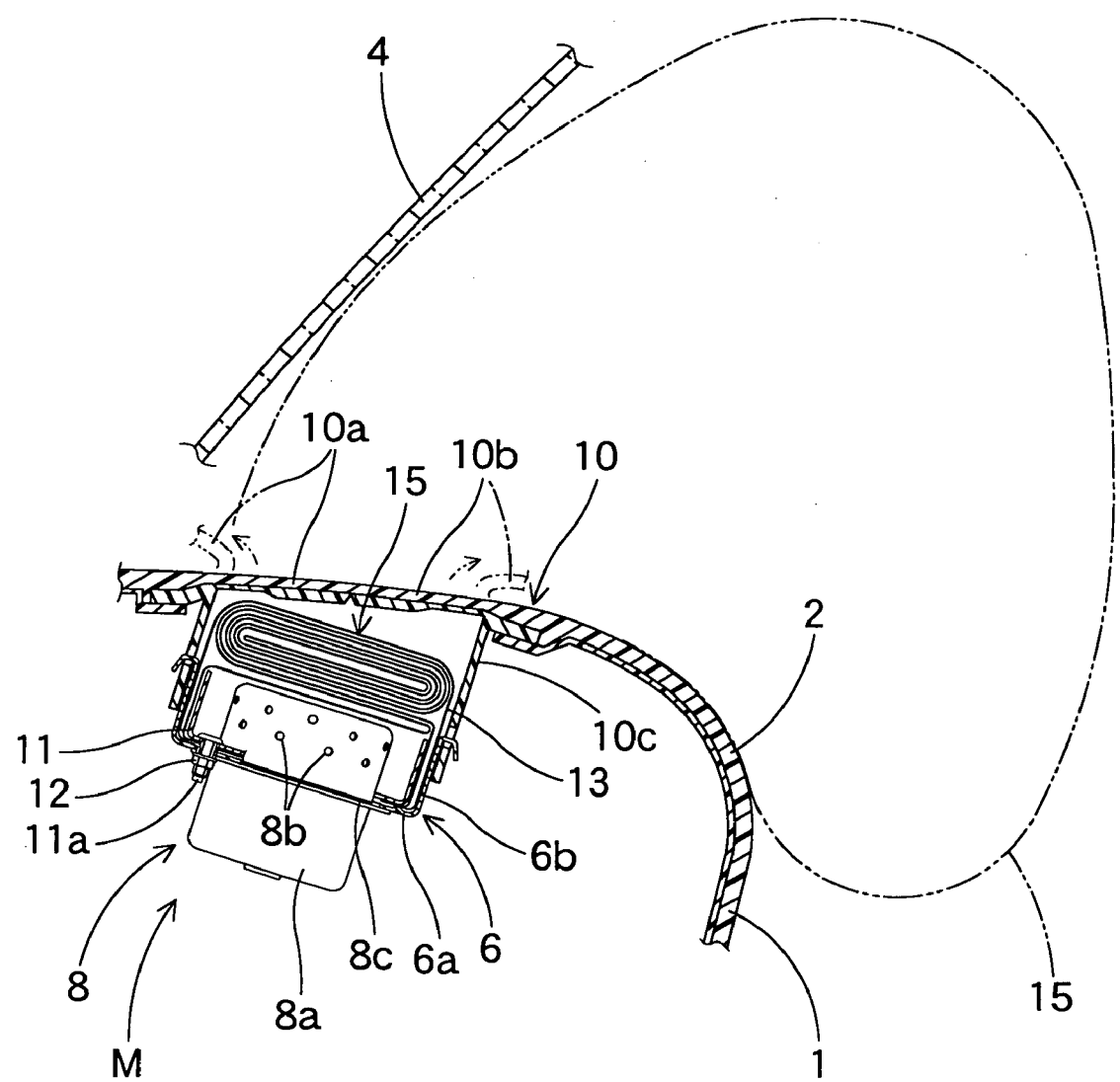
FIG. 1 is a sectional view of an airbag for a front passenger's seat embodying the present invention as used in an airbag apparatus for a front passenger's seat, taken along an anteroposterior direction of a vehicle.
Figure 2:
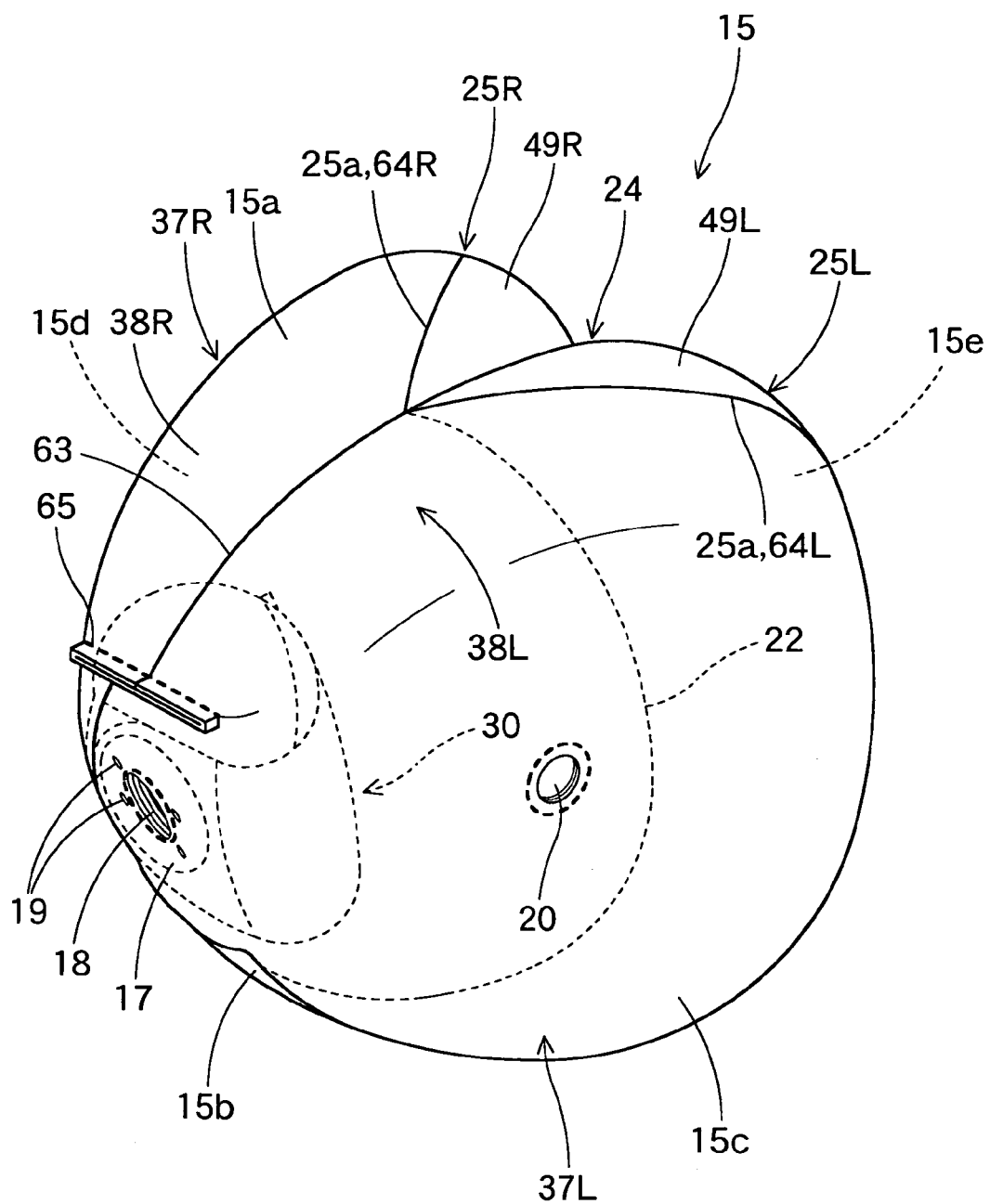
FIG. 2 is a front perspective view of the airbag of FIG. 1 inflated by itself.
Figure 3:
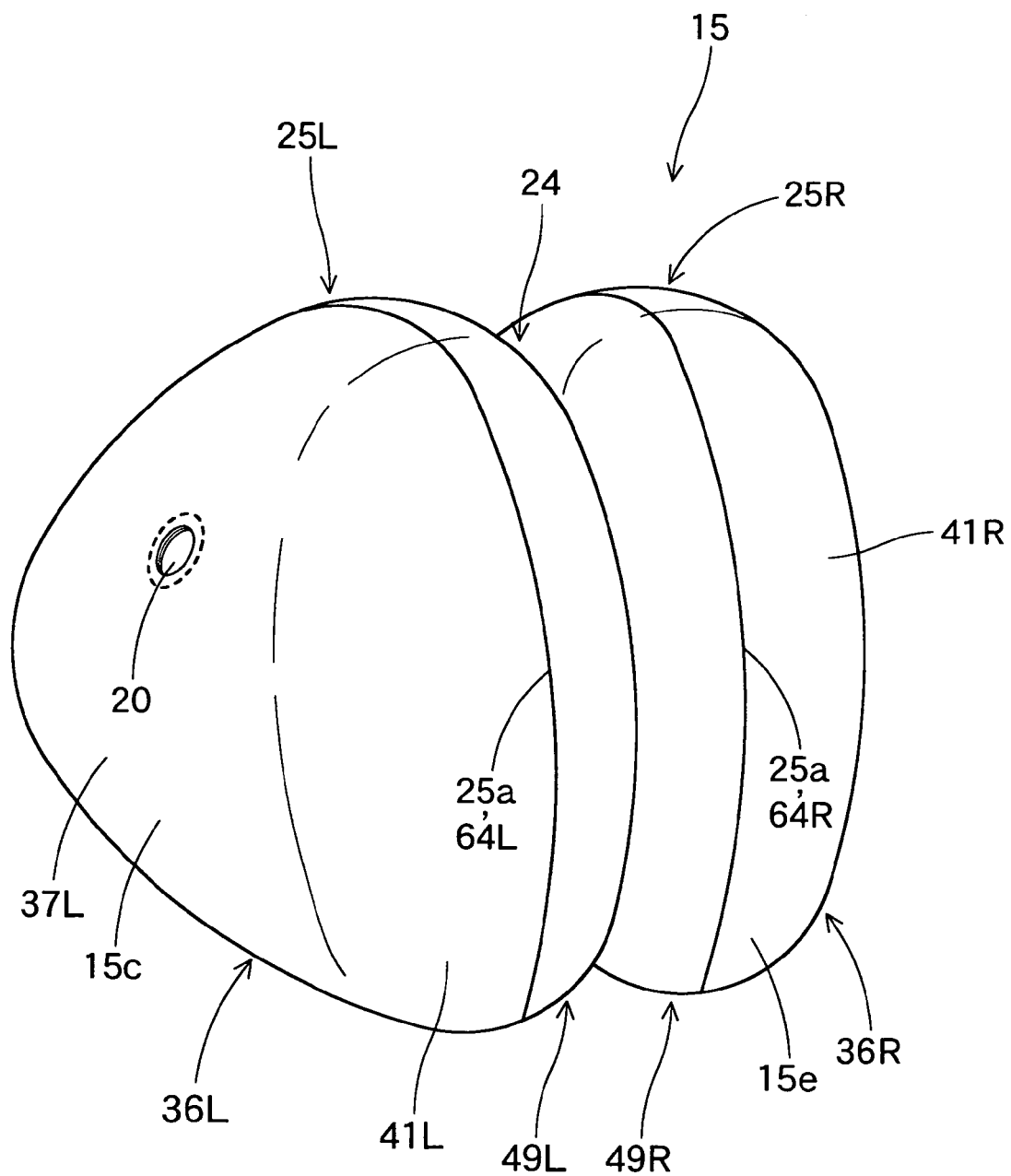
FIG. 3 is a rear perspective view of the airbag of FIG. 1 inflated by itself.
Figure 13A:
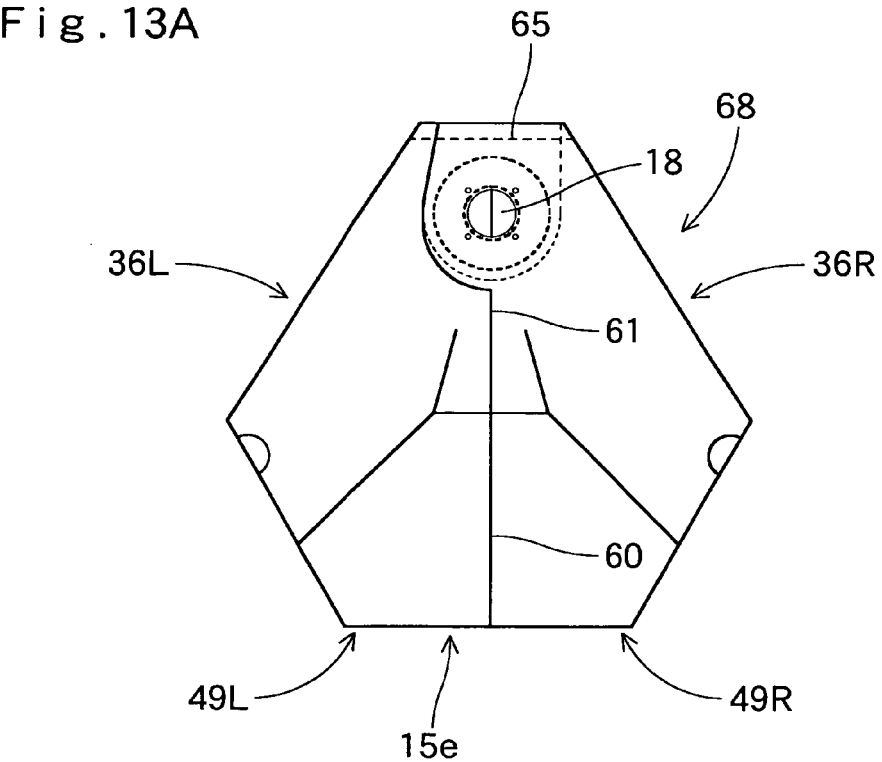
Figure 13B:
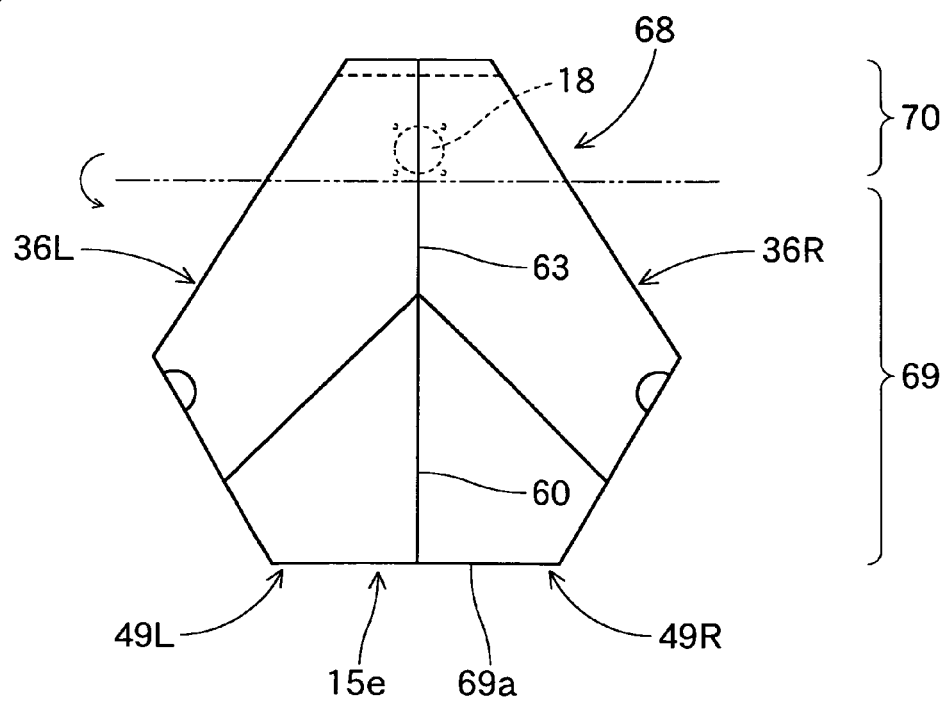
Figure 15:
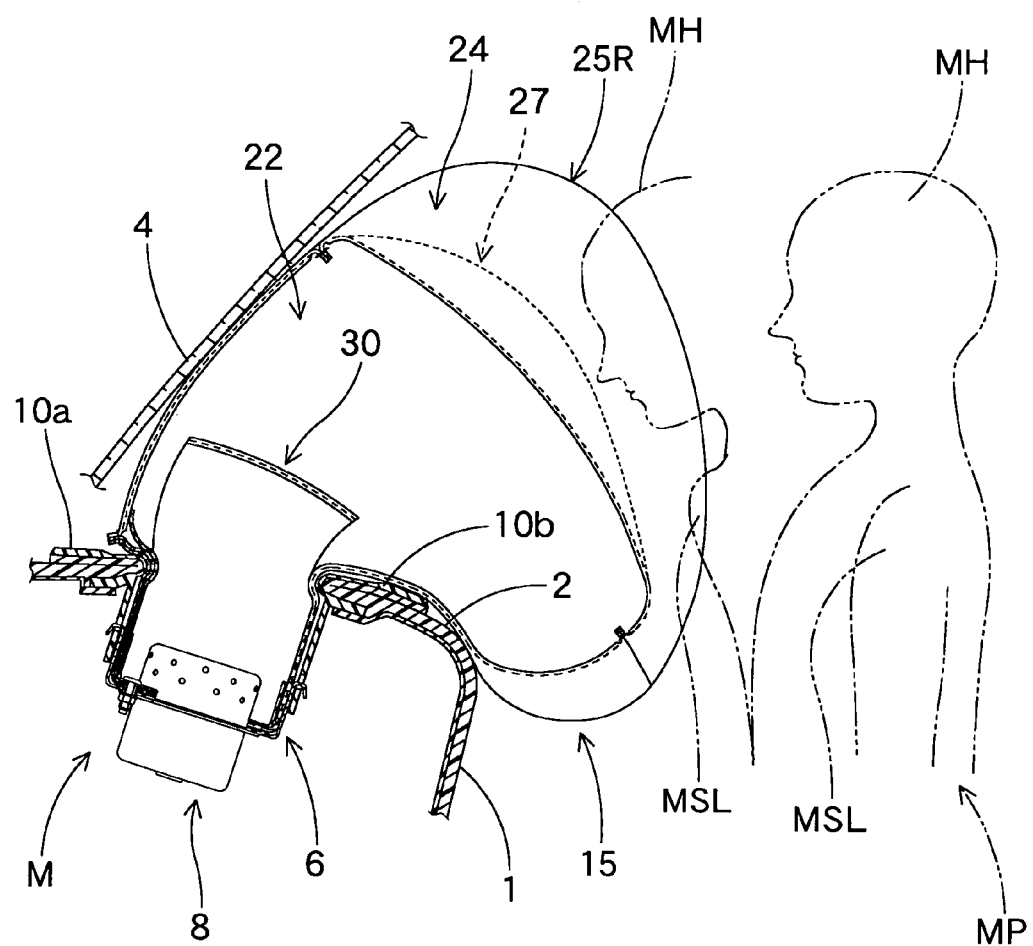
Figure 16:
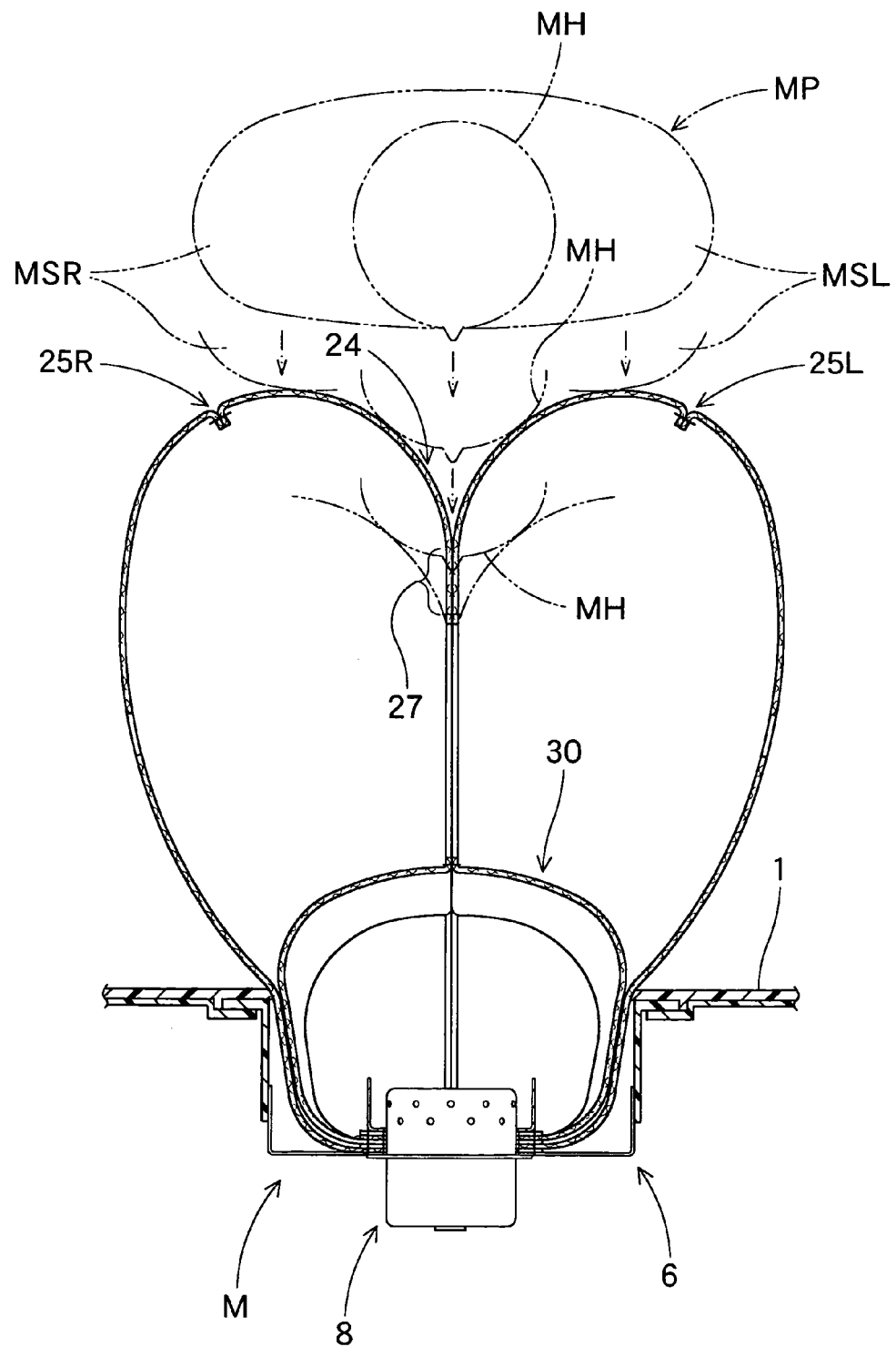
Figure 19:
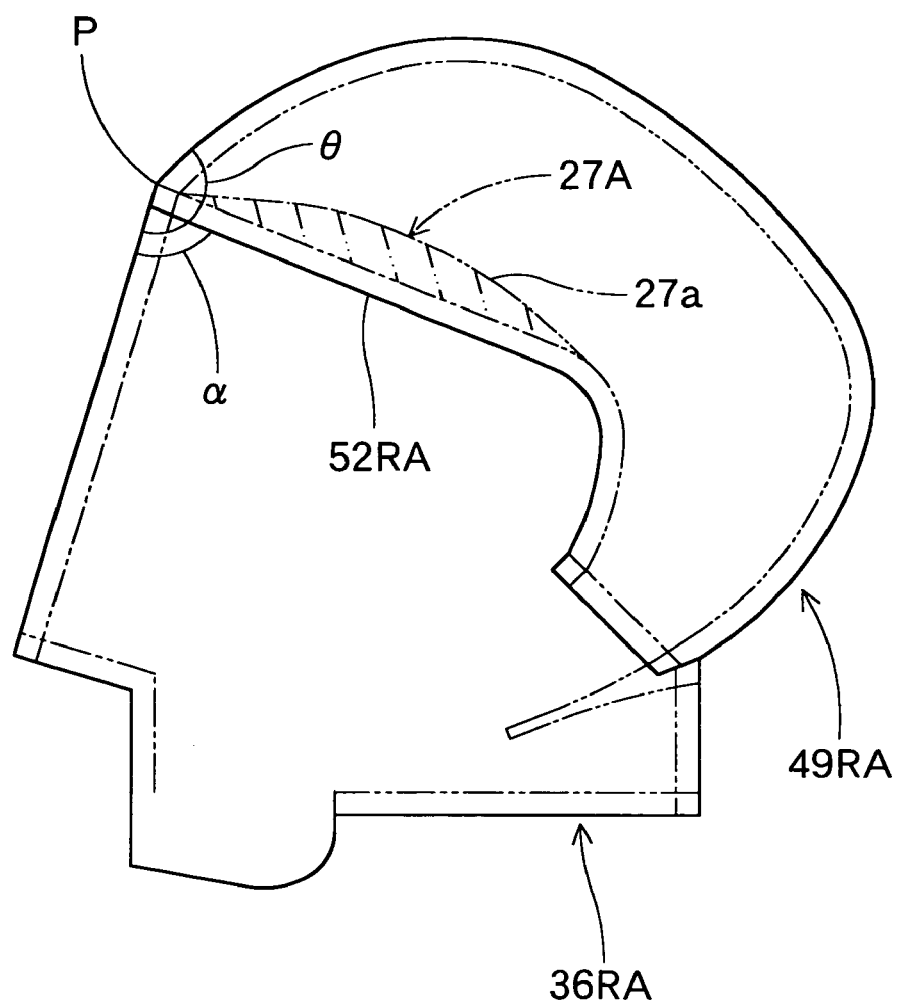
Figure 20:
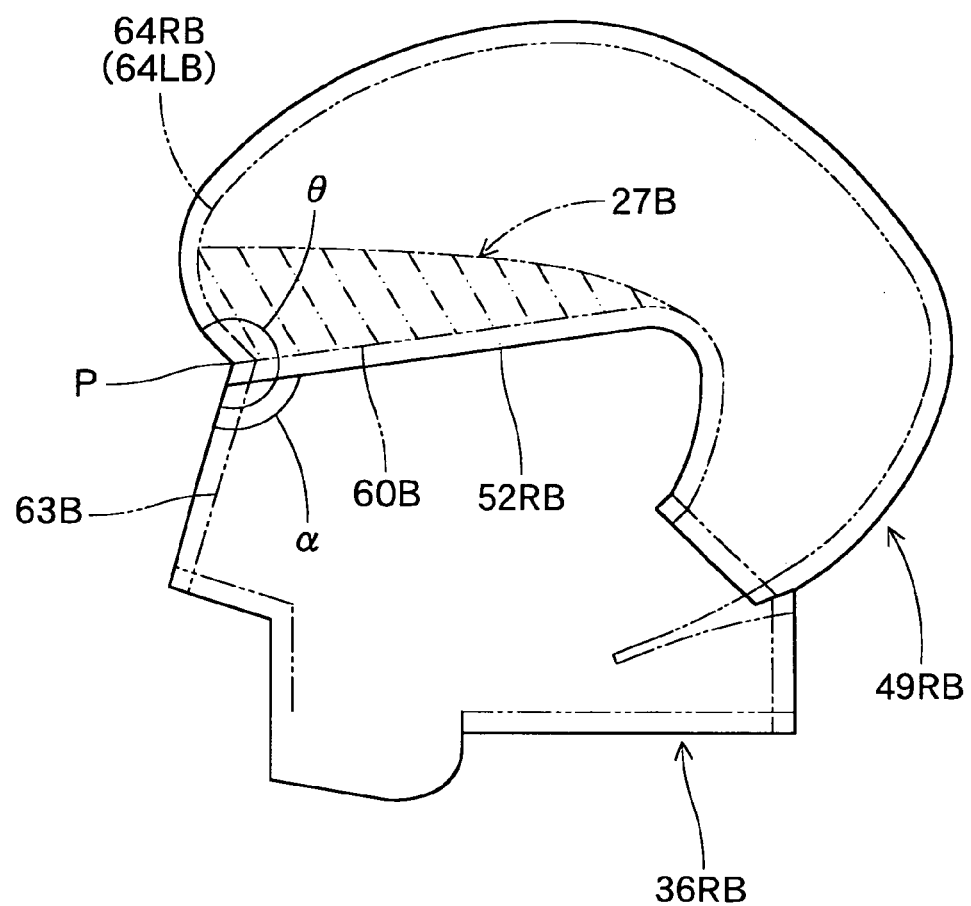
Figure 21:
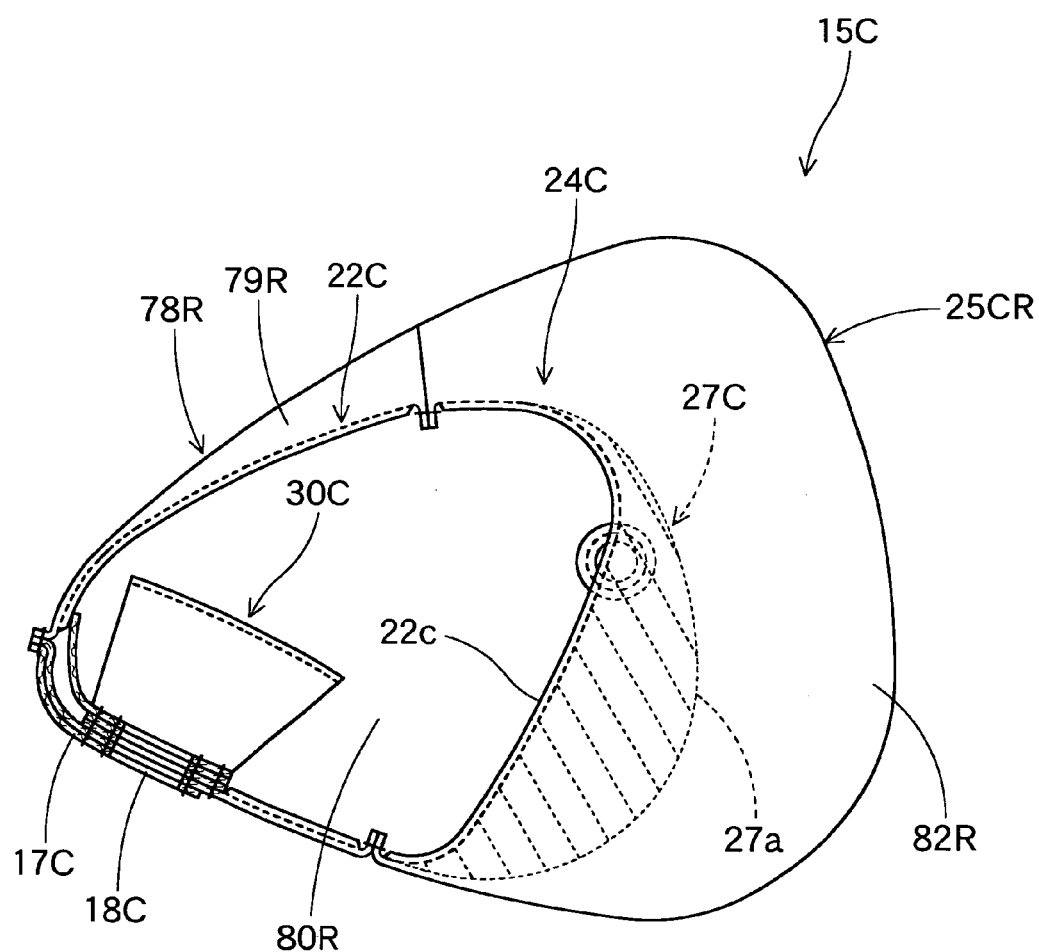
Figure 22:
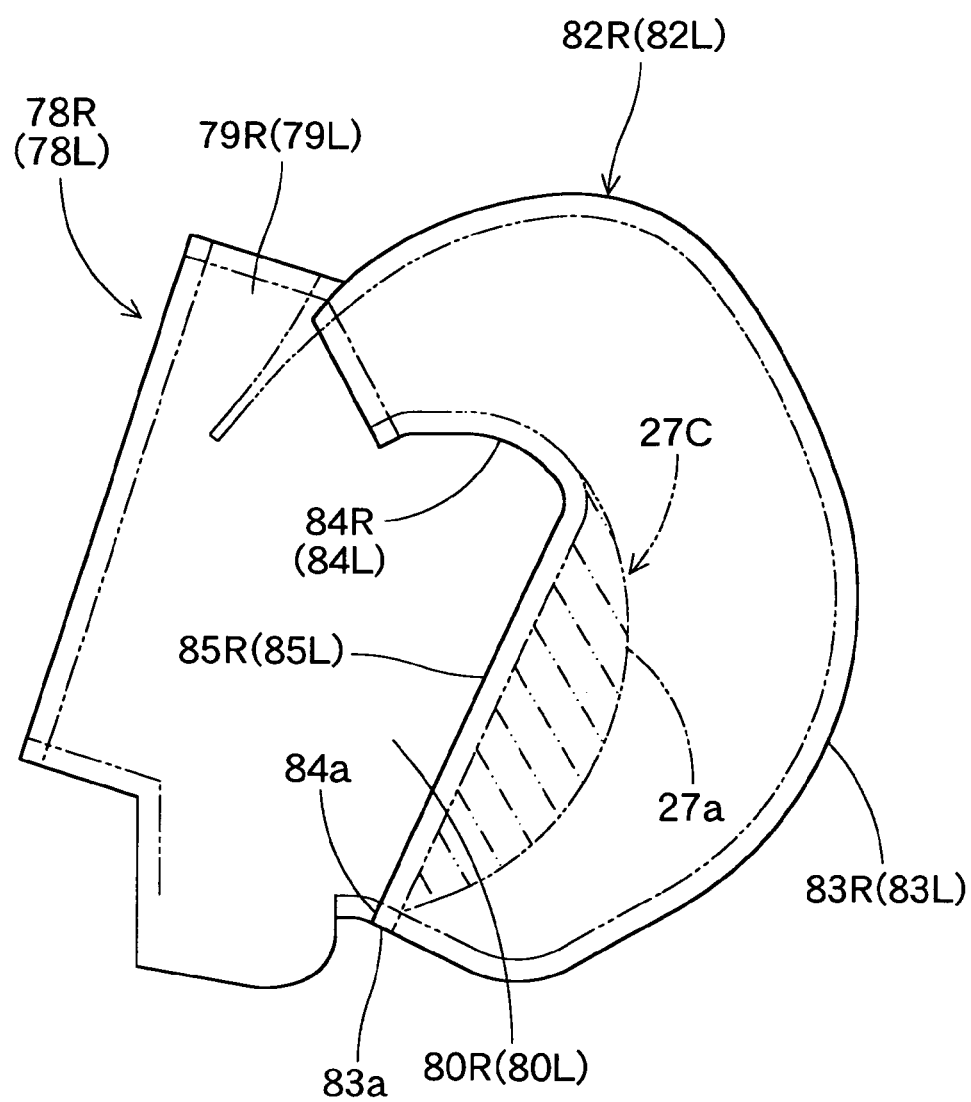
Figure 23:
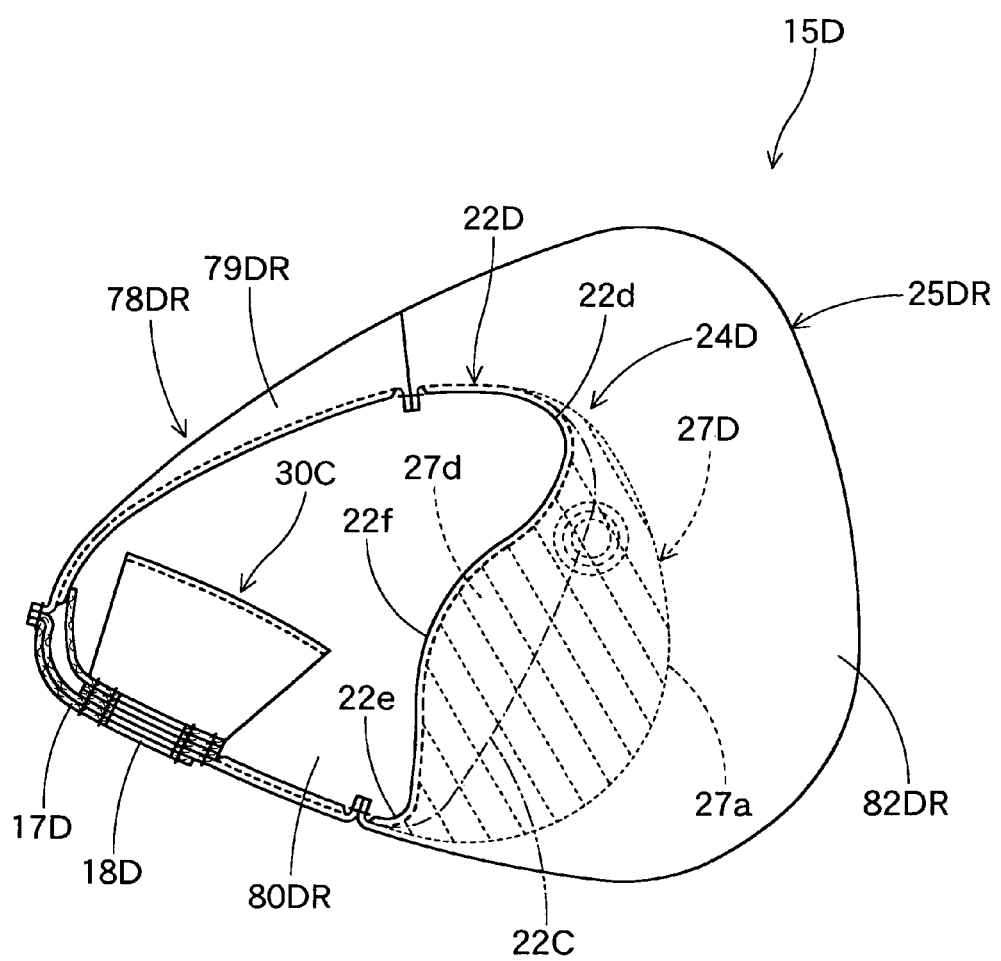
Figure 24:
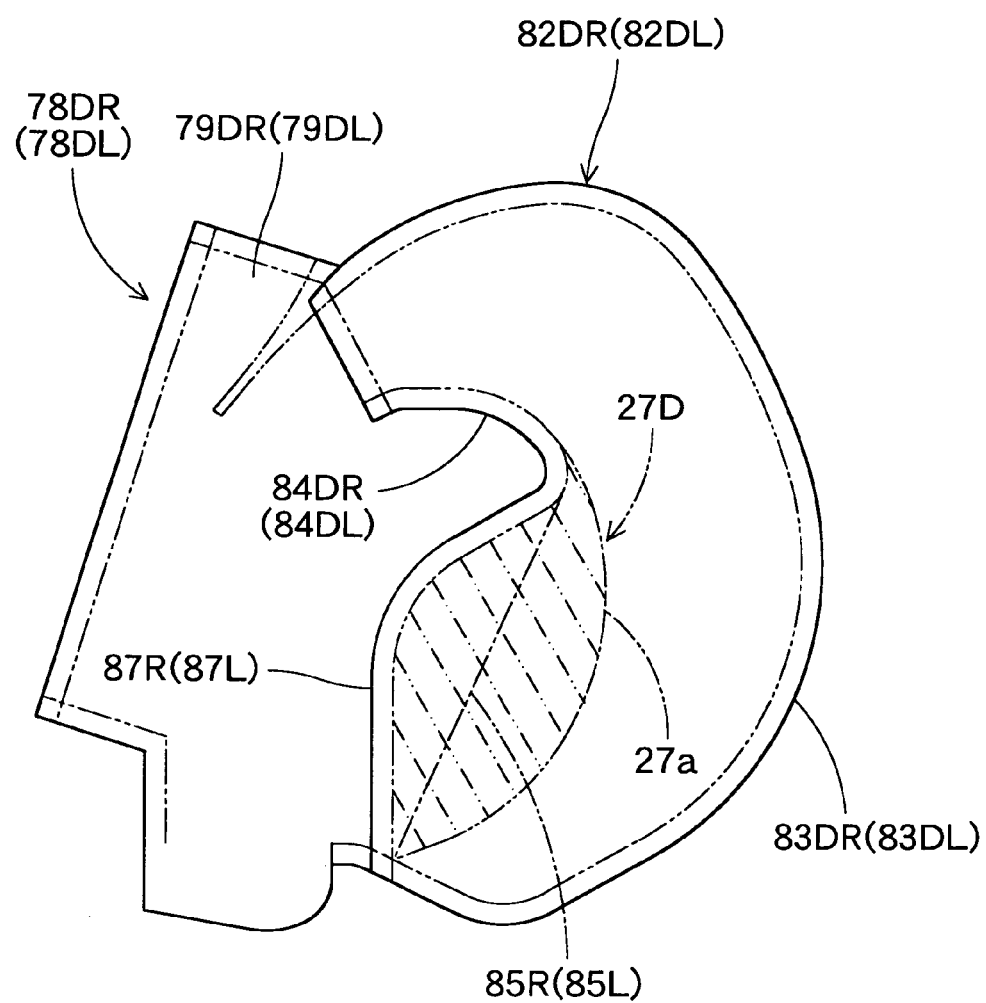

FIGS. 10A, 10B, 11A, 11B, 12A, 12B, 12C and 12D schematically illustrate a manufacturing process of the airbag of FIG. 1;

FIG. 13A illustrates the airbag of FIG. 1 subjected to preparatory folding as viewed from the side of a gas inlet;

FIG. 13B illustrates the airbag of FIG. 1 subjected to preparatory folding as viewed from the side of a rear side wall;

FIGS. 14A, 14B, 14C and 14D illustrate a folding process of the airbag of FIG. 1;

FIG. 15 illustrates the airbag of FIG. 1 in operation and as fully inflated by a vertical sectional view taken along an anteroposterior direction;

FIG. 16 illustrates the airbag of FIG. 1 in operation and as fully inflated by a cross sectional view taken horizontally;

FIGS. 17A, 17B, 18A and 18B are schematic perspective views illustrating a deployment process of the airbag of FIG. 1;

FIG. 19 is a plan view of an outer panel and inner panel according to a comparative embodiment as overlapped such that their outer circumferential edges match each other;

FIG. 20 is a plan view of an outer panel and inner panel according to another comparative embodiment as overlapped such that their outer circumferential edges match each other;

FIG. 21 is a sectional view of an airbag according to another embodiment as inflated by itself, taken along an anteroposterior direction;

FIG. 22 is a plan view of an outer panel and inner panel for use in the airbag of FIG. 21 as overlapped such that their outer circumferential edges match each other;

FIG. 23 is a sectional view of an airbag according to yet another embodiment as inflated by itself, taken along an anteroposterior direction; and FIG. 24 is a plan view of an outer panel and inner panel for use in the airbag of FIG. 23 as overlapped such that their outer circumferential edges match each other.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

As shown in FIG. 1, an airbag 15 embodying the present invention is used as a component of an airbag apparatus M for a front passenger's seat, which apparatus M is a top-mount type that is mounted in an interior of a top plane 2 of an instrument panel or dashboard 1. In addition to the airbag 15, the airbag apparatus M includes an inflator 8 for supplying the airbag 15 with inflation gas, a case 6 for housing and holding the airbag 15 and the inflator 8, a retainer 11 for attaching the airbag 15 to the case 6, and an airbag cover 10 for covering the folded-up airbag 15.

Up/down, front/rear, and left/right directions in this specification are intended to refer to up/down, front/rear, and left/right directions of a vehicle.

Referring to FIG. 1, the airbag cover 10 is integral with the dashboard 1 that is made from synthetic resin, and includes two doors, i.e. front and rear doors 10a and 10b that are adapted to open when pushed by the inflating airbag 15 upon airbag deployment. Around the doors 10a and 10b is a joint wall 10c by which the airbag cover 10 is coupled to the case 6.

The inflator 8 includes a generally columnar body 8a provided with gas discharge ports 8b and a flange 8c for attaching the inflator 8 to the case 6.

The case 6 is made of sheet metal into a generally rectangular parallelepiped shape, and has a rectangular opening at the top. The case 6 includes a bottom wall 6a having a generally rectangular plate shape to which bottom wall the inflator 8 is attached from below by insertion, and a circumferential wall 6b extending upward from an outer peripheral edge of the bottom wall 6a for engagement with the joint wall 10c of the airbag cover 10. The case 6 is further provided with unillustrated brackets, in the bottom wall 6a, to be connected to the vehicle body structure.

The retainer 11 is annular in shape and has bolts 11a. The airbag 15 and the inflator 8 are secured to the case 6 by locating the retainer 11 inside the airbag 15 such that the bolts 11a are put through the airbag 15, the bottom wall 6a of the case 6 and the flange 8c of the inflator 8, and then fastened into nuts 12.

Referring to FIGS. 2 to 7, the airbag 15 is designed to be inflated into a generally square conical contour whose front end is the top of the square cone. The airbag 15 includes an upper side wall 15a and a lower side wall 15b extending generally along a lateral direction on upper and lower sides, a left side wall 15c and a right side wall 15d extending generally along an anteroposterior direction on left and right sides and a rear side wall 15e extending generally along the lateral direction to face a seat in such a manner as to connect the upper side wall 15a and lower side wall 15b. In this embodiment, the rear side wall 15e adapted to face toward a passenger MP upon airbag deployment serves as a passenger protection area. At the vicinity of the lateral center of the front end of the lower side wall 15b at full inflation is a round gas inlet 18 for introducing inflation gas. In a peripheral region 17 of the inlet port 18 are mounting holes 19 for receiving the bolts 11a of the retainer 11 to attach the peripheral region 17 of the gas inlet 18 to the bottom wall 6a of the case 6. Each of the left side wall 15c and right side wall 15d of the airbag 15 is provided with a vent hole 20 for releasing extra inflation gas.

Figure 4:
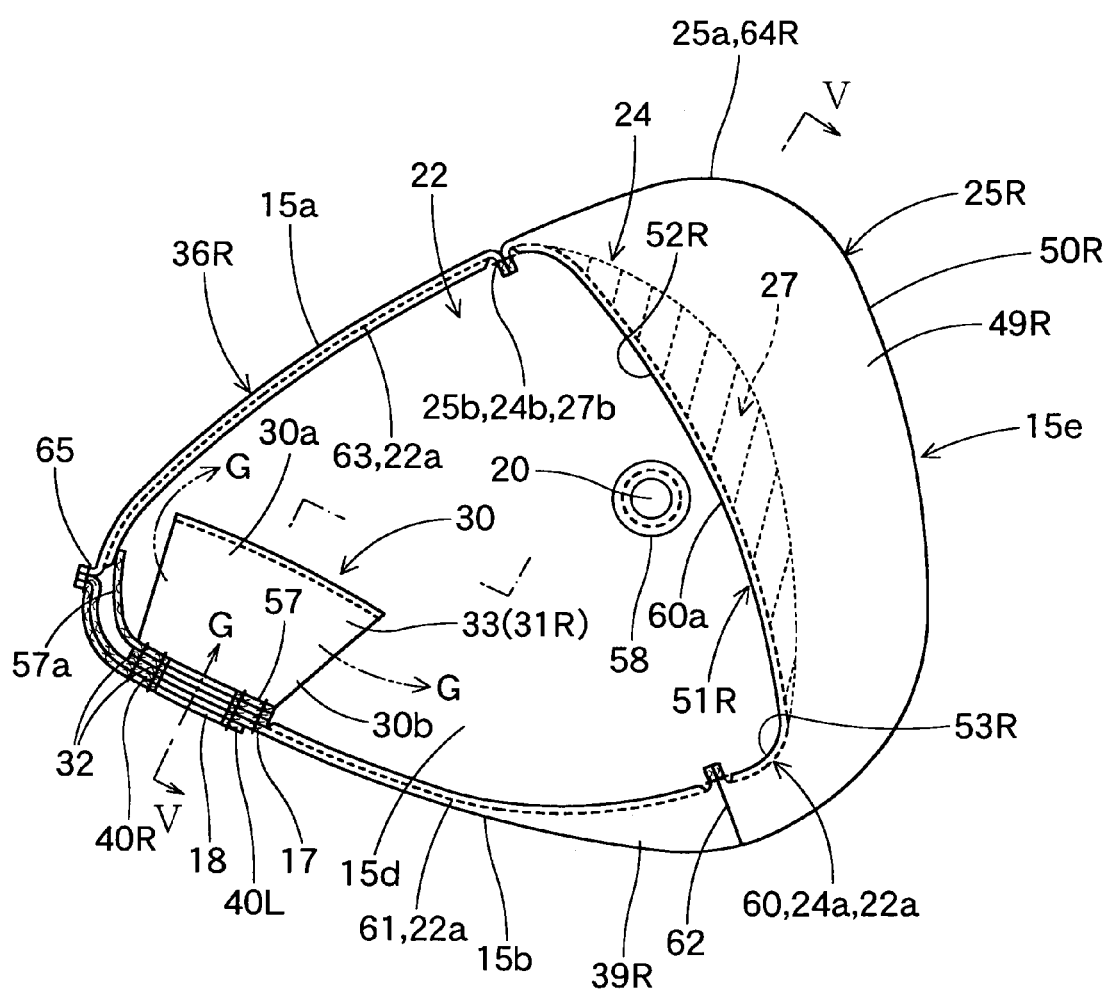
FIG. 4 is a sectional view of the airbag of FIG. 1 inflated by itself, taken along an anteroposterior direction.
Figure 5:
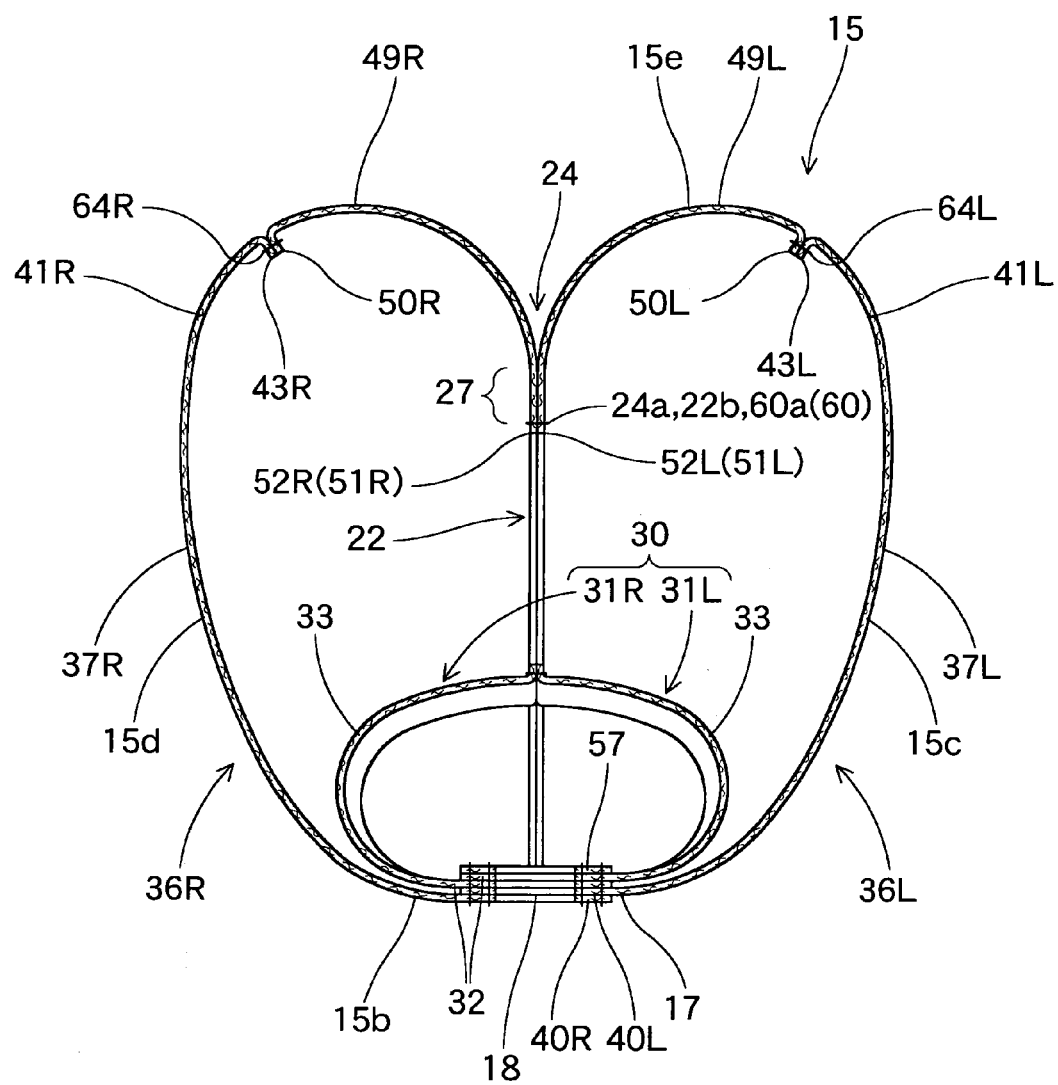
FIG. 5 is a sectional view taken along line V-V of FIG. 4.
Figure 6:
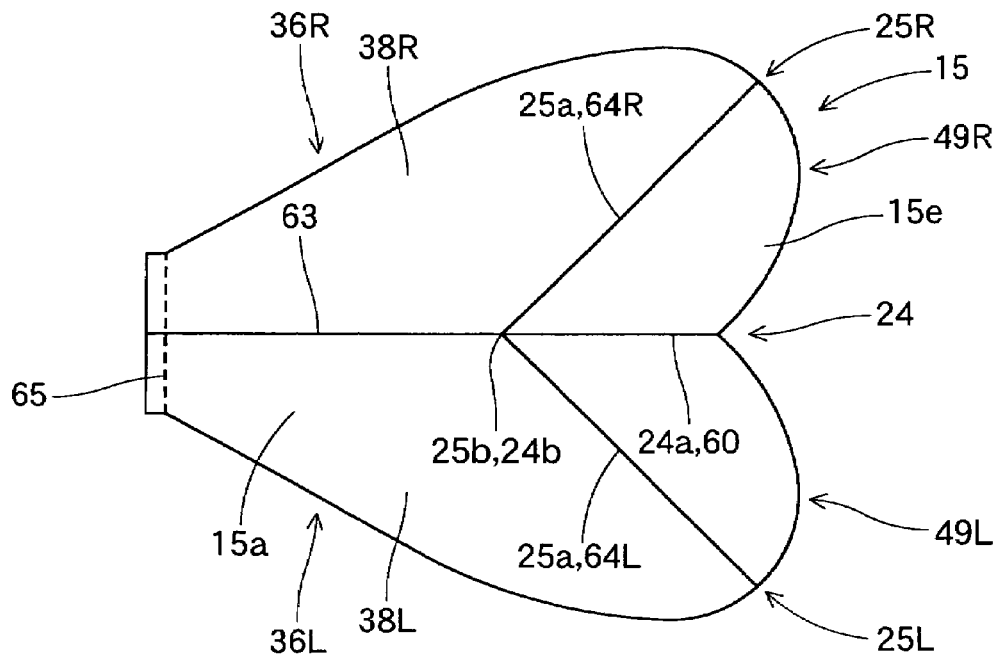
FIG. 6 is a plan view of the airbag of FIG. 1 inflated by itself.

As shown in FIGS. 4 and 5, the airbag 15 internally includes above the gas inlet 18 at a front area thereof a communication port 22 communicating left and right areas of the airbag 22. The communication port 22 is arranged such that an opening plane thereof extends generally vertically, and its circumferential edge 22a is defined by an inner seam 60 that sews together inner circumferential edges 51L and 51R of later-described inner panels 49L and 49R, a seam 63 that sews together upper edges 42L and 42R of later-described outer panels 36L and 36R and a seam 61 that sews together lower edges 45L and 45R of the outer panels 36L and 36R as shown in FIG. 4. The airbag 15 at full inflation includes at its rear part (or on the rear side wall 15e) a recess 24 that recesses forward at the lateral center corresponding to the circumferential edge 22a of the communication port 22 and raised regions 25L and 25R that project relatively rearward on the left and right sides of the recess 24. The recess 24 extends generally vertically along with the circumferential edge 22a of the communication port 22 while the raised regions 25L and 25R extend continuously in the vertical direction on either side of the recess 24. The raised regions 25L and 25R are adapted to arrest left and right shoulders MSL and MSR of a passenger MP when he/she contacts the inflated airbag 15 while the recess 24 serves to receive and protect a head MH of the passenger MP after the shoulders MSL and MSR are arrested by the raised regions 25L and 25R (FIGS. 15 and 16). This unevenness created by the raised regions 25L and 25R and the recess 24 continues on the entire area of the rear side wall 15e and extends downward and forward to the vicinity of the gas inlet 18 in the airbag 15 as fully inflated. The raised regions 25L and 25R are intercommunicated by the communication port 22.

The above-described inner seam 60 that sews the inner circumferential edges 51L and 51R of later-described inner panels 49L and 49R together forms a bottom 24a of the recess 24 or a part of the circumferential edge 22a of the communication port 22 while outer seams 64L and 64R that sew up each of outer circumferential edges 50L and 5OR of the inner panels 49L and 49R and each corresponding outer or rear edges 43L and 43R of later-described outer panels 36L and 36R form tops 25a of the raised regions 25L and 25R. The airbag 15 of the embodiment is designed to be formed into a laterally symmetrical contour relative to the gas inlet 18 at full inflation.

As best shown in FIG. 4, the airbag 15 internally includes a flow regulating cloth 30. The flow regulating cloth 30 is located over the gas inlet 18 and has a generally cylindrical shape extending in an anteroposterior direction. Having openings 30a and 30b at the front and rear ends, the flow regulating cloth 30 redirects inflation gas G fed via the inlet 18 forward and rearward as shown in FIG. 4.

Figure 8:
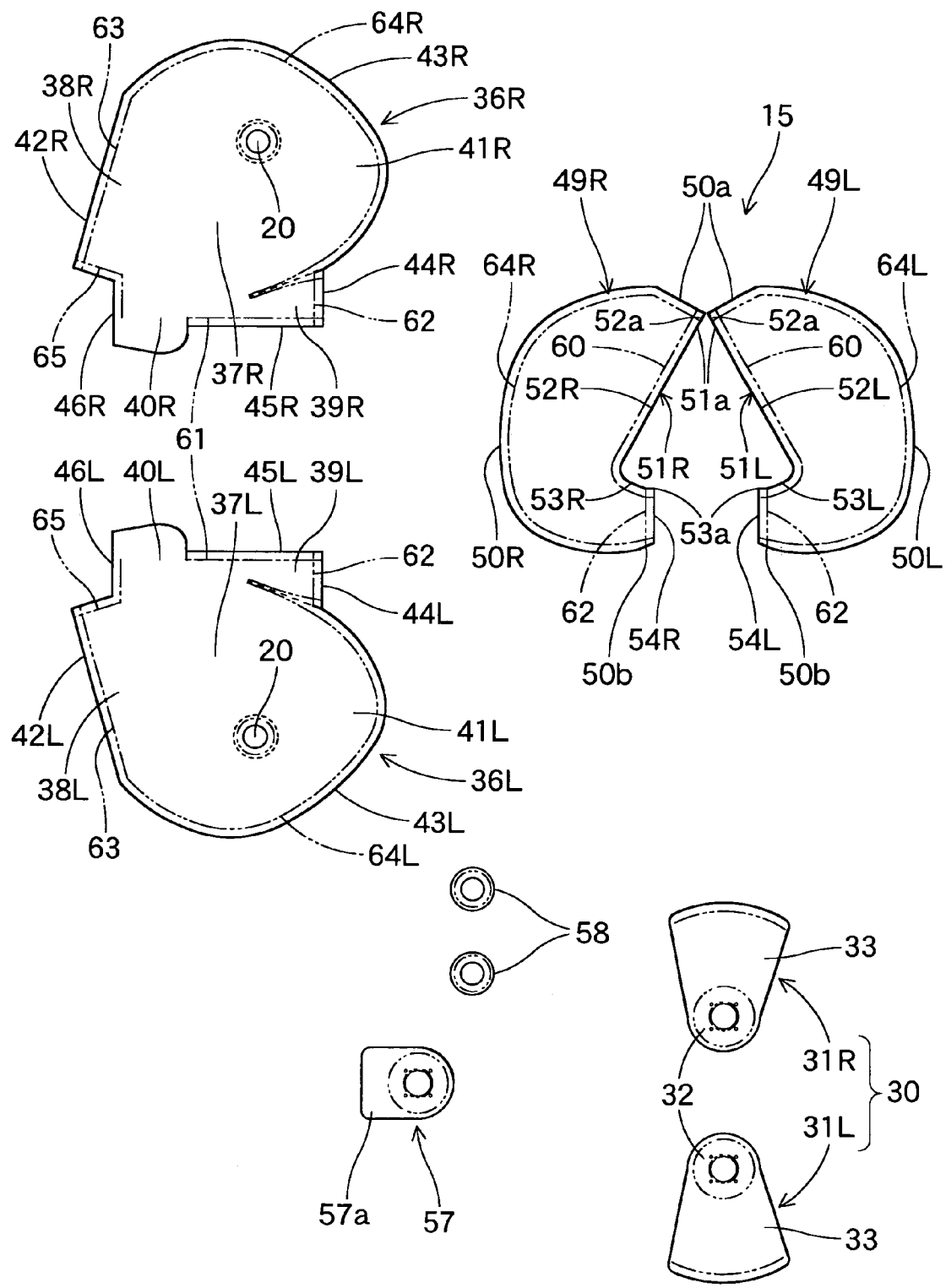
FIG. 8 illustrates base cloths of the airbag of FIG. 1 by plan views.

The flow regulating cloth 30 of this embodiment is made of materials 31L and 31R shown in FIG. 8. The materials 31L and 31R have laterally symmetric contours. Each of the materials 31L and 31R includes a joint portion 32 that constitutes the peripheral area 17 of the gas inlet 18 and a main body 33 extending toward the left or right from the joint portion 32. Each of the joint portions 32 includes apertures (reference numerals omitted) correspondent to the gas inlet 18 and mounting holes 19. In this embodiment, the flow regulating cloth 30 is formed by superimposing the joint portions 32 of the materials 31L and 31R one on the other so that the apertures of the respective materials match one another, sewing the joint portions 32 to later-described outer panels 36L and 36R of the airbag 15 together with a later-described reinforcing cloth 57 at entire peripheral edges of the joint portions 32, and then by sewing up ends of the main bodies 33.

The airbag 15 is made by joining peripheral edges of predetermined shaped base cloths illustrated in FIG. 8, i.e., a pair of outer panels 36L and 36R that are adapted to form laterals of the fully inflated airbag 15 and a pair of inner panels 49L and 49R that are adapted to be located on an inner area in the transverse direction of the inflated airbag 15.

The outer panels 36L and 36R are configured laterally symmetrical to constitute laterals of the fully inflated airbag 15. In this embodiment, specifically, the panels 36L and 36R are configured to split up widthwise outside areas relative to the tops 25a of the raised regions 25L and 25R out of areas of the upper side wall 15a, lower side wall 15b, left side wall 15c, right side wall 15d and rear side wall 15e. Each of the panels 36L and 36R has a generally sectorial contour that widens toward the rear and bulging at rear edge.

Referring to FIG. 8, each of the outer panels 36L and 36R has a central region 37L/37R for forming the left/right side wall 15c/15d generally at the vertical center, an upper region 38L/38R located above the central region 37L/37R for forming a left/right area on the upper side wall 15a and a lower region 39L/39R located below the central region 37L/37R for forming a left/right area on the lower side wall 15b. The lower region 39L/39R each has such a generally triangular contour that is continuous with the central region 37L/37R at the front end and projects partially rearward from the central region 37L/37R. The outer panel 36L/36R further includes in front of and below the lower region 39L/39R a generally semicircular projecting region 40L/40R for forming the peripheral area 17 of the gas inlet 18, and a rear region 41L/41R located at the rear of the upper region 38L/38R and central region 37L/37R and forming a widthwise outside area relative to the tops 25a of the raised regions 25L and 25R on the rear side wall 15e.

The inner panels 49L and 49R are configured into a laterally symmetrical pair of bands each curving in generally C-shape as shown in FIG. 8. The inner panels 49L and 49R are located on an inner side in the lateral direction of the inflated airbag 15 in such a manner as to split up an area from the tops 25a of the raised regions 25L and 25R to the bottom 24a of the recess 24 in the rear side wall 15e. The outer circumferential edges 50L and 50R of the inner panels 49L and 49R are configured to accord to the curvature of rear edges 43L and 43R of the outer panels 36L and 36R. Each of the inner circumferential edges 51L and 51R of the inner panels 49L and 49R includes a horizontal straight portion 52L/52R extending rearward from front ends 50a of the outer circumferential edges 50L and 5OR generally along an anteroposterior direction and a vertical edge 53L/53R extending downwardly from and generally perpendicularly to the horizontal straight portion 52L/52R, thereby having a generally inverse-L shape projecting rearward and upward. In other words, each of the inner panels 49L and 49R has such a contour that a front end 50a of the outer circumferential edge 50L/50R and a front end 52a of the horizontal straight portion 52L/52R or a front end 51a of the inner circumferential edges 51L/51R converge. Each of the inner panels 49L and 49R further includes at the bottom a bottom edge 54L/54R corresponding to a lower rear edge 44L/44R of the lower region 39L/39R of the outer panels 36L and 36R. The bottom edge 54L/54R has such a contour as to link a lower end 53a of the vertical edge 53L/53R and a rear end 50b of the outer circumferential edge 50L/50R together and intersect the outer circumferential edge 50L/50R and inner circumferential edges 51L/51R.

In the airbag 15, as described above, the inner seam 60 that sews together the inner circumferential edges 51L and 51R of the inner panels 49L and 49R forms, at full inflation of the airbag 15, the bottom 24a of the recess 24 or a part of the circumferential edge 22a of the communication port 22 while the outer seams 64L and 64R that sew up each of the outer circumferential edges 50L and 50R of the inner panels 49L and 49R and each corresponding rear edges 43L and 43R of the outer panels 36L and 36R form the tops 25a of the raised regions 25L and 25R.

When fully inflated, the airbag 15 includes proximate an upper edge 22b of the communication port 22 a contact portion 27 where outer surfaces of the inner panels 49L and 49R are in a face-to-face contact as shown in FIGS. 4, 5. In this embodiment, the contact portion 27 is so formed above the upper edge 22b of the communication port 22 as to have a crescentic shape whose chord is defined by the horizontal straight portion 52L/52R of the inner panels 40L and 49R. The contact portion 27 is created and maintained by an inner pressure of the fully inflated airbag 15 that acts on the outer panels. 36L and 36R and the inner panels 49L and 49R that form the airbag 15 in combination. The airbag 15 is so configured that the inner panels 49L and 49R are restrained from contacting if the inner pressure is less than that at full inflation of the airbag.

Figure 9:
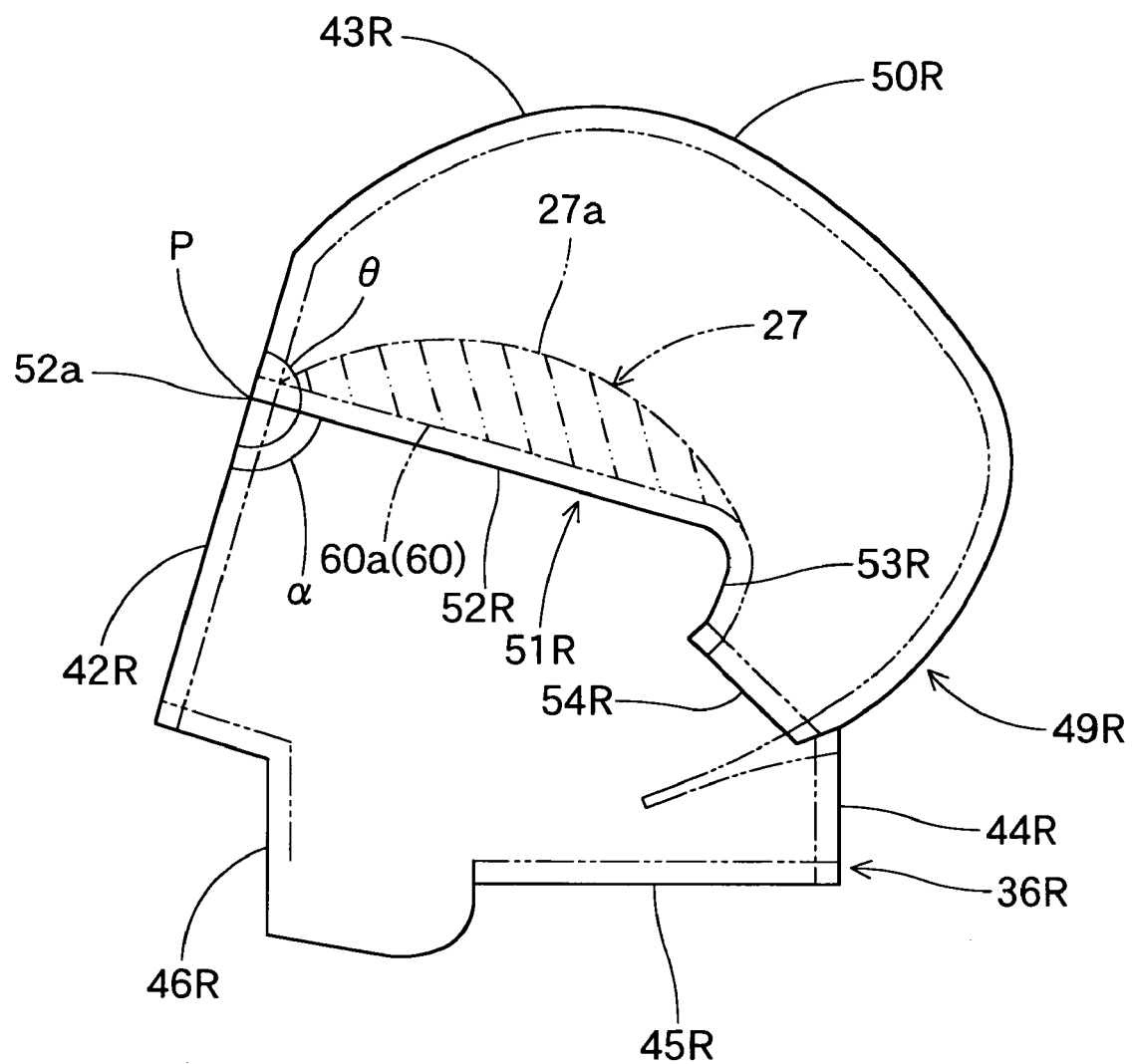
FIG. 9 is a plan view of an outer panel and inner panel for use in the airbag of FIG. 1 as overlapped such that their outer circumferential edges match each other.

Presumptively, the contact portion 27 is created as follows: In designing an airbag, particularly in designing a position of the inner circumferential edge of the inner panel relative to the rear edge of the outer panel, i.e. in designing a width of the inner panel, a base line for the inner circumference is calculated in order to decide on a proper unevenness of the recess and raised portions at full inflation of the airbag. The base line defines a boundary of a deepness of the recess. If setting the inner circumferential edge of the inner panel outside of the base line by designing the width of the inner panel small, the raised regions open transversely in a separating manner at airbag inflation and make the recess shallow upon airbag inflation. On the contrary, if setting the inner circumferential edge of the inner panel inside of the base line by designing the width of the inner panel wide, the raised regions come close to each other in the transverse direction at inflation. At this time, however, the recess is not figured deeper than a hypothetical recess in a case where the inner circumferential edge is set for the base line. Instead, the inner panels are brought into face-to-face contact by the inner pressure of the airbag as if extra fleshes squashed each other proximate the inner seam that sews up the inner circumferential edges (or the bottom of the recess). That is, setting the inner circumferential edge inside the base line when designing an inner panel will provide a face-to-face contact portion of the raised regions at the front side thereof or in the vicinity of the communication port. In the airbag 15 embodying the invention, an outer circumference 27a of the contact portion 27, as indicated by double-dashed lines in FIG. 9, is presumed to be the base line. The contact portion 27 is formed on an area defined by this base line or outer circumference 27a and a straight portion 60a of the inner seam 60 that sews up the horizontal straight portions 52L and 52R by locating the horizontal straight portions 52L and 52R inside the base line.

Referring to FIG. 9, the outer circumferential edge 5OR (50L) of the inner panel 49R (49L) is configured congruent with the rear edge 43R (43L) of the outer panel 36R (36L). When the inner panel 49R (49L) is laid over the outer panel 36R (36L), the horizontal straight portion 52R (52L) intersects the upper edge 42R (42L) of the outer panel 36R (36L) and extends rearward from an intersection point P with the upper edge 42R (42L). Specifically, the horizontal straight portion 52R (52L) extends rearward from an anteroposteriorly intermediate point on a straight upper outer edge of the outer panel 36R (36L). That is, the upper edge 42R (42L) and the rear edge 43R (43L) of the outer panel 36R (36L) is delimited by the intersection point P and, the rear edge 43R (43L) includes a straight portion extending rearward from the intersection point P and a curving portion extending continuously from the straight portion.

Further, as shown in FIG. 9, an intersection angle α of the horizontal straight portion 52R (52L) and the upper edge 42R (42L) is configured at 90° and an intersection angle θ of the upper edge 42R (42L) and rear edge 43R (43L) of the outer panel 36R (36L) about the intersection point P is configured at 180°. The intersection angle θ is desirably configured within a range of 150°≦θ≦270°. If the intersection angle θ is less than 150° as shown in FIG. 19, the rise of the raised region will be small and an area of the contact portion 27A will be relatively small at full inflation of the airbag even if horizontal straight portions 52RA are located inside the base line (or an outer circumference 27a of a contact portion 27A). In the outer panel 36RA and inner panel 49RA of FIG. 19, the intersection angle θ is set at 149.1° while the intersection angle α is set at 83.8°. On the contrary, if the intersection angle θ exceeds 270° as shown in FIG. 20, although the contact portion 27B may be enough in the area, four seams extending radially from the intersection point P (i.e., an inner seam 60B, a seam 63B, and outer seams 64LB and 64RB) overlap and pile on the intersection point P, so that they may squash up as if reducing the volume of an airbag, and further may complicate automatic sewing. In the outer panel 36RB and inner panel 49RB of FIG. 20, the intersection angle θ is set at 270° while the intersection angle α is set at 114.1°. The intersection angle α may be suitably varied according to the value of the intersection angle θ, and more specifically, it is desirably configured within a range of 80°<θ<115°, which is about half value of that of the intersection angle θ.

Referring back to FIG. 8, the airbag 15 of the embodiment further includes a generally circular reinforcing cloth 57 for reinforcing the periphery 17 of the gas inlet 18. The reinforcing cloth 57 includes an extended region 57a that extends forward from the gas inlet 18 and which extended region 57a covers an interior side of a later-described seam 65 (FIG. 4) positioned proximate the inlet 18 for protecting the seam 65 from inflation gas. In this specific embodiment, additional reinforcing cloths 58 are applied to the vent holes 20, too (FIGS. 4 and 8).

In this embodiment, the outer panels 36L and 36R, the inner panels 49L and 49R, reinforcing cloths 57, 58 and the materials 31L and 31R for forming the flow regulating cloth 30 are made of flexible woven fabric of polyester, polyamide or the like and which fabric is not coated by such coating agents as silicone.

Figure 10A:
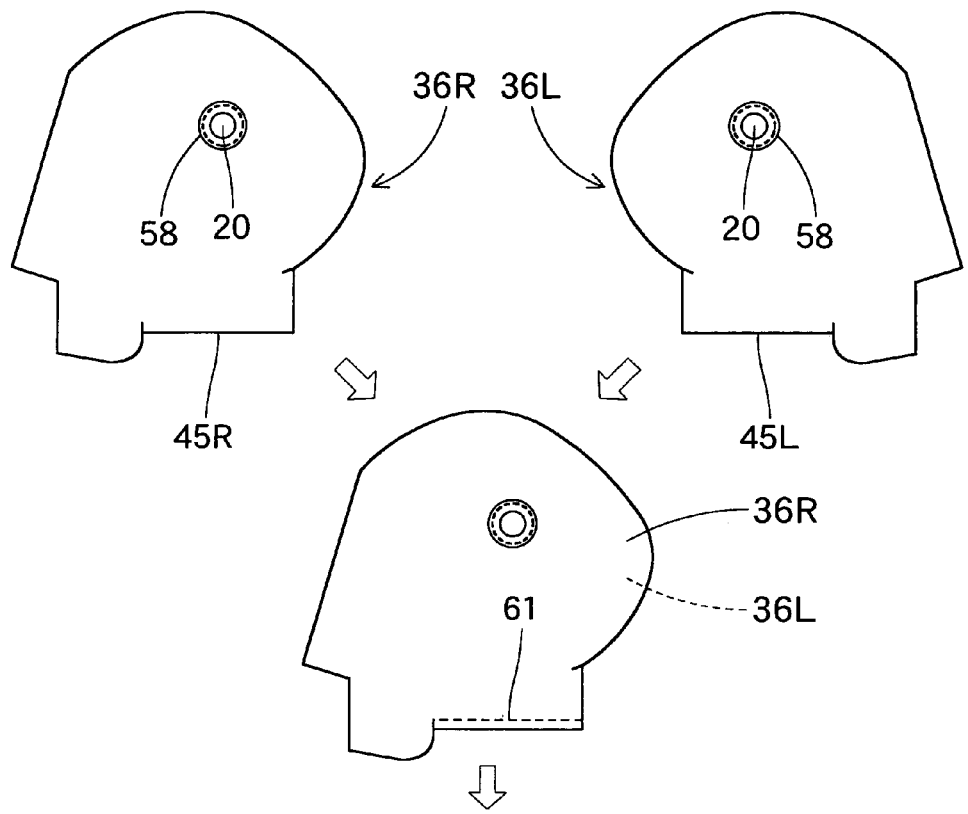
Figure 10B:
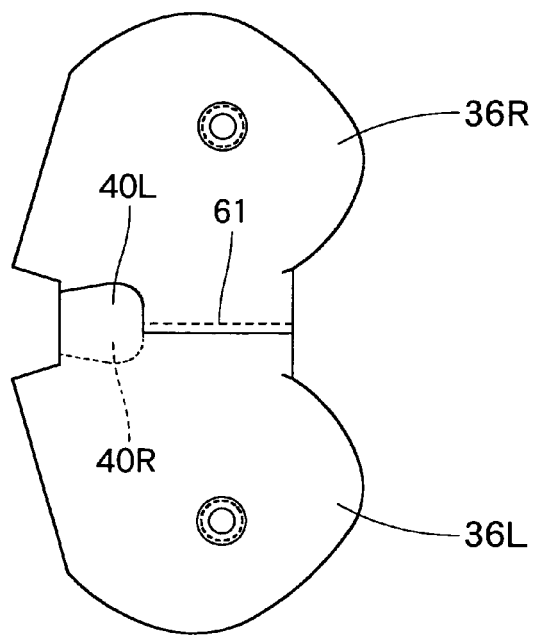
Figure 11A:
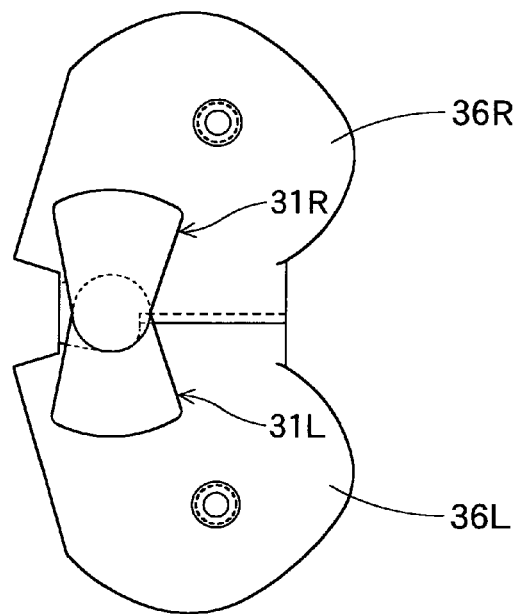
Figure 11B:
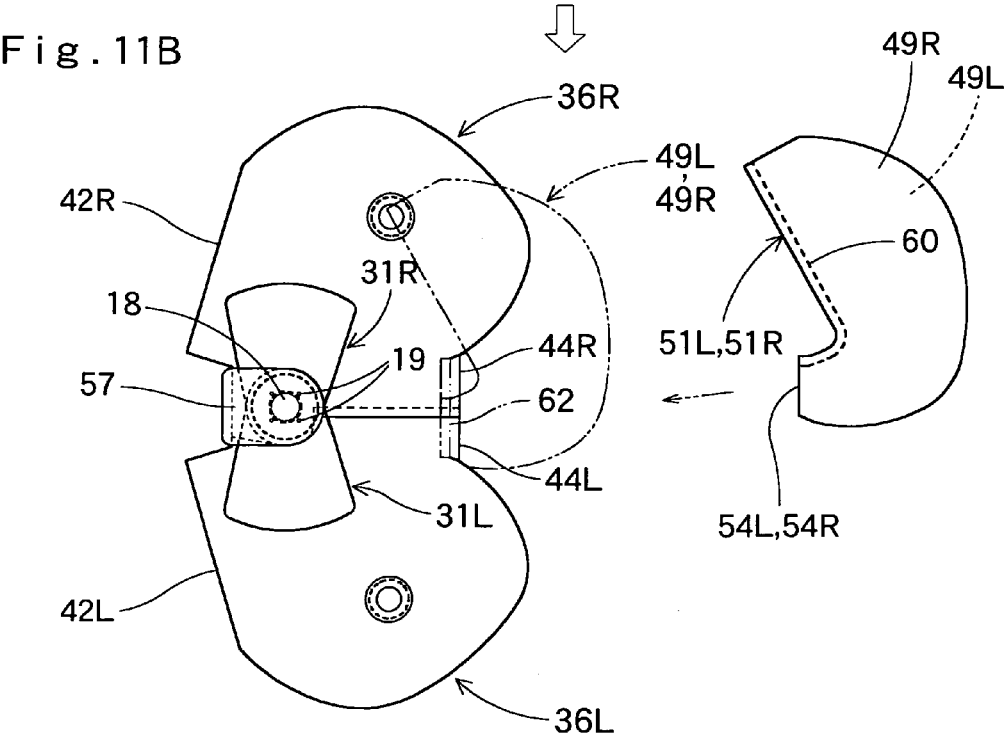

Manufacturing of the airbag 15 is now described. Firstly, as shown in FIG. 11B, the inner panels 49L and 49R are flattened and superimposed one on the other so that their circumferential edges match each other, and then the inner circumferential edges 51L and 51R are sewn together with sewing yarn to form the inner seam 60. The reinforcing cloths 58 are sewn to circumferences of the vent holes 20 on the outer panels 36L and 36R as shown in FIG. 10A. Then also as shown in FIG. 10A, the outer panels 36L and 36R are flattened and superimposed one on the other so that their circumferential edges match each other and then lower edges 45L and 45R are sewn together with sewing yarn to form the seam 61. Subsequently, as shown in FIG. 10B, the outer panels 36L and 36R are opened with the seam 61 disposed inside and the projecting regions 40L and 40R overlapping, and then the materials 31L and 31R of the flow regulating cloth 30 and the reinforcing cloth 57 are superimposed on the projecting regions 40L and 40R in that order and sewn to the projecting regions 40L and 40R along and proximate the gas inlet 18 and along the periphery of the joint portions 32 of the materials 31L and 31R with sewing yarn as shown in FIGS. 11A and 11B. Thereafter, punching work is applied to form the gas inlet 18 and mounting holes 19 as shown in FIG. 11B.

Figure 7:
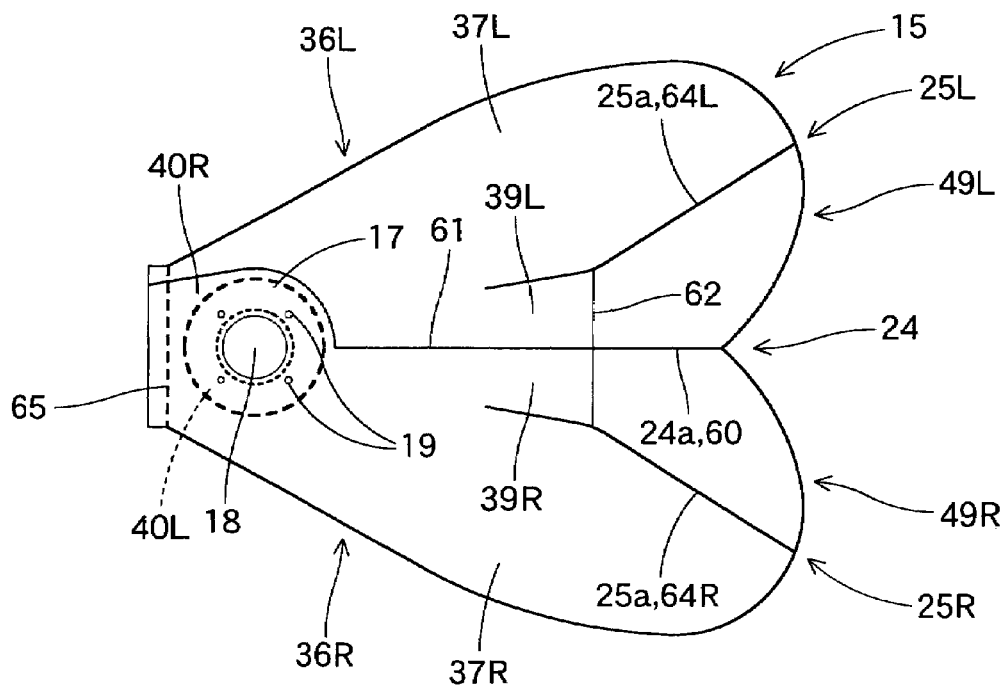
FIG. 7 is a bottom view of the airbag of FIG. 1 inflated by itself.
Figure 12A:
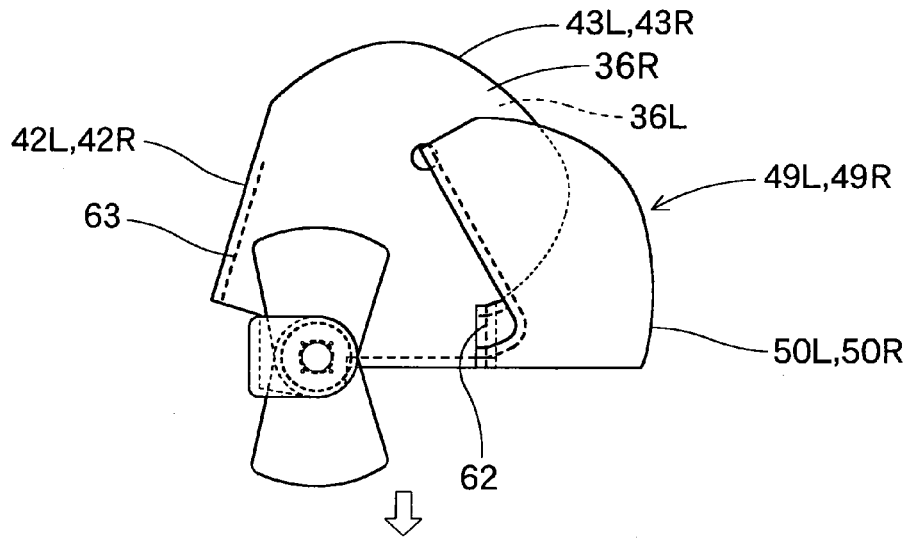
Figure 12B:
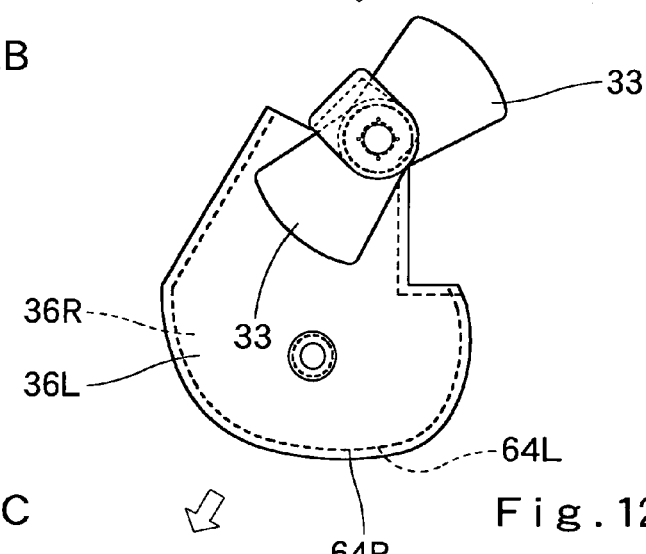

Subsequently, as indicated by double-dashed lines in FIG. 11B, the lower edges 54L and 54R of the inner panels 49L and 49R are opened and sewn to the lower rear edges 44L and 44R of the outer panels 36L and 36R to form a seam 62. Then as shown in FIG. 12A, the outer panels 36L and 36R are lapped one over the other so that the upper edges 42L and 42R match each other and the upper edges 42L and 42R are sewn together to form the seam 63, and then the rear edges 43L and 43R of the outer panels 36L and 36R and the outer circumferential edges 50L and 50R of the inner panels 49L and 49R are respectively sewn together to form the outer seams 64L and 64R as shown in FIG. 12B. The outer seams 64L and 64R of this specific embodiment extend forward relative to the seam 62 in such a manner as to intrude into the lower side wall 15b as shown in FIG. 7.

Figure 12C:
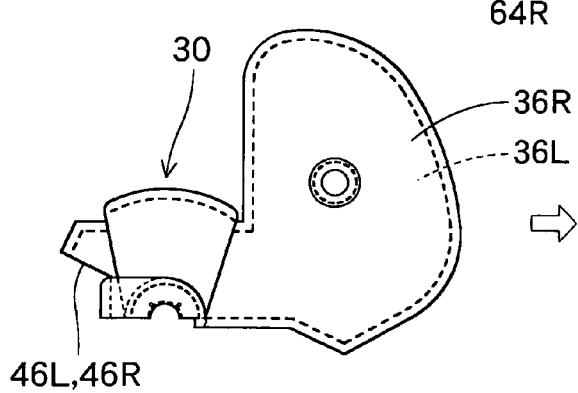
Figure 12D:
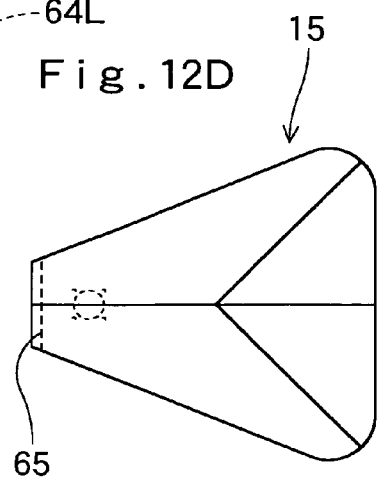

Thereafter, as shown in FIG. 12C, the main bodies 33 of the materials 31L and 31R are sewn together at their ends to complete the flow regulating cloth 30. Then the airbag 15 is reversed inside out utilizing unsewn regions of the outer panels 36L and 36R (i.e. front edges 46L and 46R) so that seam allowances of circumferential edges may not appear on outside, and the front edges 46L and 46R of the outer panels 36L and 36R are respectively sewn together to form a seam 65 as shown in FIG. 12D. Thus the airbag 15 is completed.

Figure 14A:
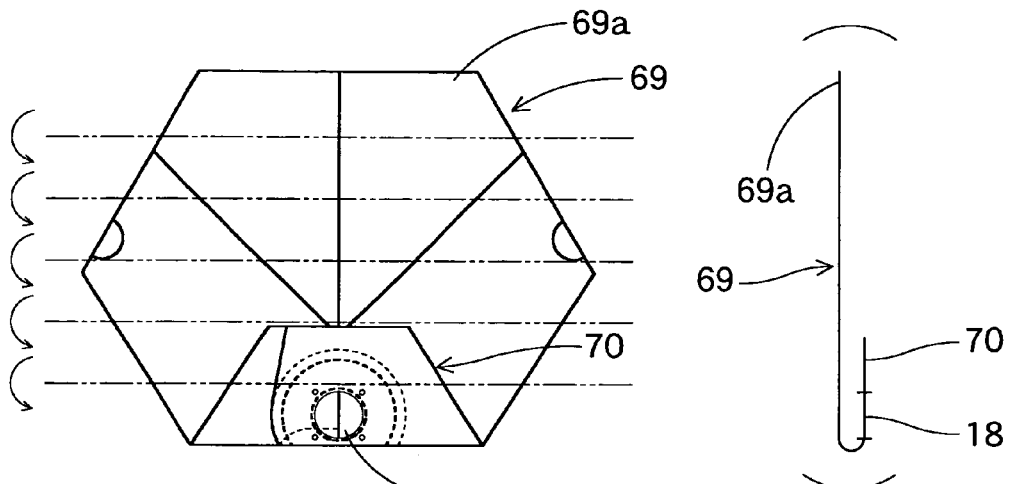
Figure 14B:
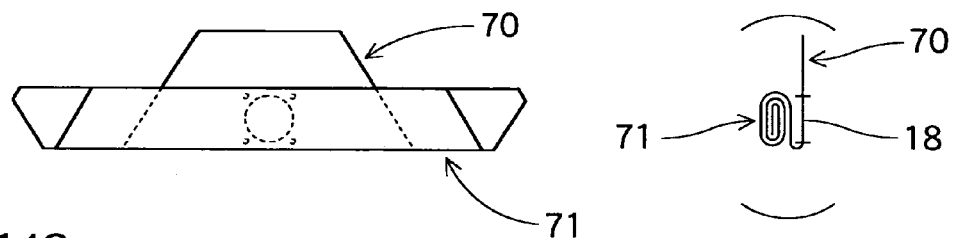
Figure 14C:
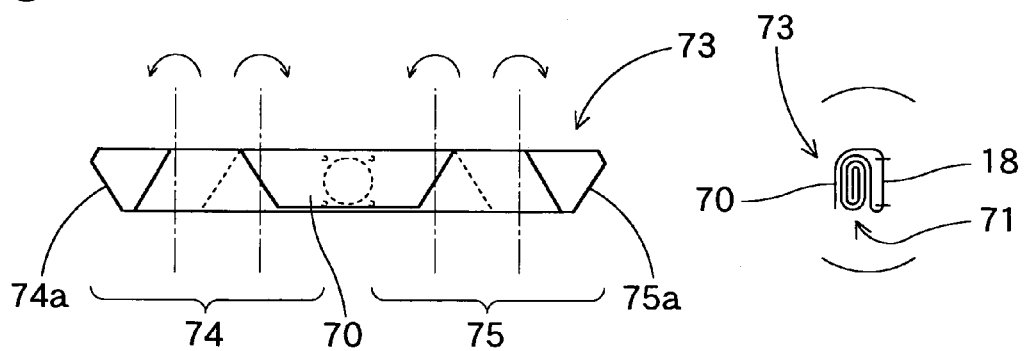
Figure 14D:
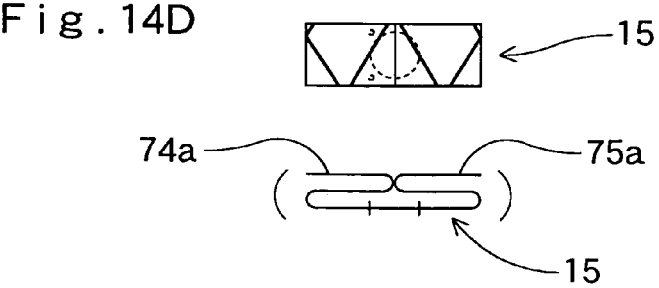

After manufacturing the airbag 15, the retainer 11 is placed inside the airbag 15 so that the bolts 11a project from the mounting holes 19, and then the airbag 15 is folded up in that state. The folding process firstly includes preparatory folding that folds the airbag 15 on predetermined creases extending along a transverse direction in such a manner as to flatten a vertically central area of the inner panels 49L and 49R or a central area of the rear side wall 15e and makes the airbag 15 generally flat. The preparatory folding provides a preparatorily-folded airbag 68 as shown in FIGS. 13A and 13B. Then the folding process includes horizontal folding that reduces an anteroposterior width of the preparatorily-folded airbag 68 by folding it up on creases extending along a transverse direction and vertical folding that reduces a transverse width of a horizontally-folded airbag 73 by folding up the airbag 73 on creases extending anteroposteriorly. As shown in FIGS. 13A and 13B, the preparatorily-folded airbag 68 is configured symmetrical about the inner seam 60 and the seams 61 and 63 continuing from the inner seam 60 as the seams 60, 61 and 63 are arranged vertically at the transverse center. The horizontal folding is applied to this preparatorily-folded airbag 68 as follows: a rear region 69 (FIG. 13B), which is located at the rear of the gas inlet 18, is rolled from its end 69a toward the lower side wall 15b in such a manner as to form horizontal creases, and then a rolled portion or folded region 71 is placed over the gas inlet 18 as shown in FIGS. 14A and 14B. Subsequently a front region 70 (FIG. 13B) of the preparatorily-folded airbag 68, which is located in front of the gas inlet 18, is folded on a horizontal crease and superimposed on the folded portion 71 as shown in FIGS. 14B and 14C. Thereafter, the vertical folding is conducted such that a left region 74 located on the left of the gas inlet 18 and a right region 75 located on the right of the gas inlet 18, of the horizontally-folded airbag 73, are folded respectively on a crease extending anteroposteriorly in such a manner as to bring ends 74a and 75b of the left and right regions 74 and 75 close to the gas inlet 18 as shown in FIGS. 14C and 14D. The left region 74 and right region 75 are folded in a bellows fashion in this specific embodiment.

The airbag 15 thus folded up is wrapped up by a breakable wrapping sheet 13 (FIG. 1) to keep the folded-up configuration. Then the airbag 15 is placed on the bottom wall 6a of the case 6 while putting the bolts 11a through the bottom wall 6a. Subsequently, the body 8a of the inflator 8 is set in the case 6 from the lower side of the bottom wall 6a while the bolts 11a projecting downward from the bottom wall 6a are inserted through the flange 8c of the inflator 8. Thereafter, by fastening nuts 12 with the bolts 11a projecting from the flange 8c of the inflator 8, the airbag 15 and inflator 8 are attached to the bottom wall 6a of the case 6.

Then if the circumferential wall 6b of the case 6 is attached to the joint wall 10c of the airbag cover 10 in the dashboard 1 which has been mounted on vehicle, and the unillustrated brackets of the case 6 are fixed to predetermined positions of vehicle body structure, the airbag apparatus M for a front passenger's seat is mounted on vehicle.

After mounting the airbag apparatus M on vehicle, in the event of a frontal collision of vehicle, inflation gas is discharged from the gas discharge ports 8b of the inflator 8 to inflate the airbag 15. The airbag 15 inflates and breaks the wrapping sheet 13, then pushes and opens the doors 10a and 10b of the airbag cover 10 as shown in FIGS. 1 and 15. Then the airbag 15 emerges from an opening provided by the opening of the doors 10a and 10b and deploys upward and rearward in such a manner as to stuff a space between the top plane 2 of the dashboard 1 and the windshield 4 as shown in FIGS. 1, 15 and 16.

Figure 17A:
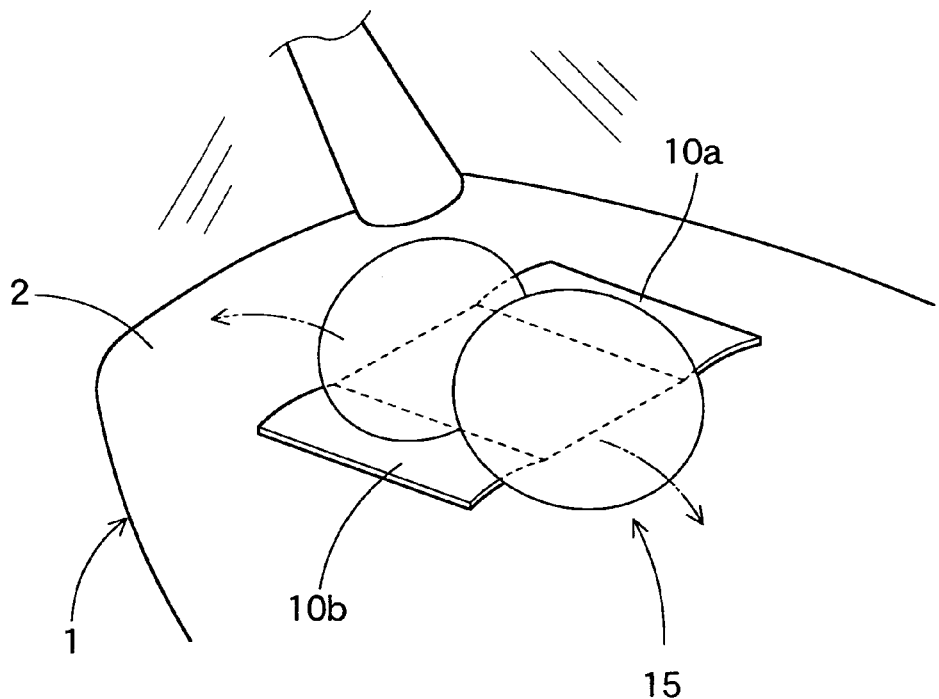
Figure 17B:
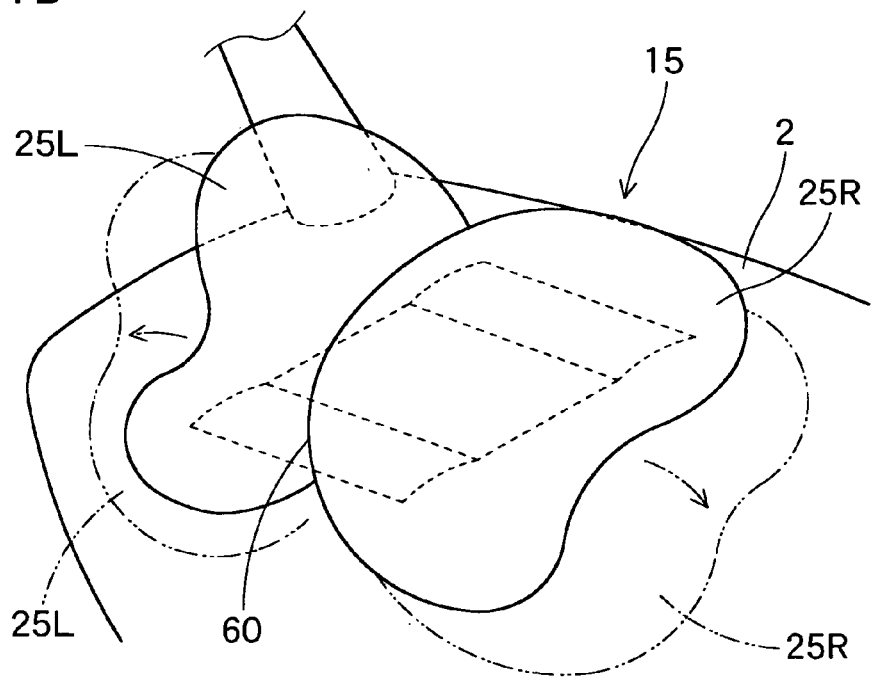
Figure 18A:
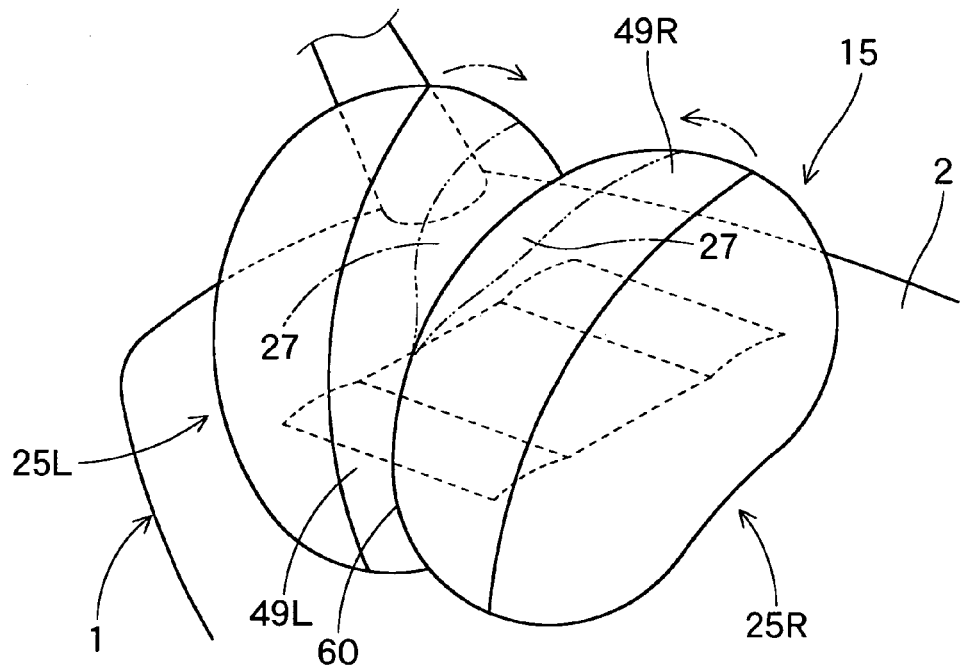

The airbag 15 of this embodiment at full inflation includes the contact portion 27 where outer surfaces of the inner panels 49L and 49R are in face-to-face contact proximate the circumferential edge 22a of the communication port 22 located at the lateral center. The contact portion 27 makes the communication port 22 relatively small and helps prevent an area around the communication port 22 from engaging an occupant during airbag deployment even in the event that the occupant is seated excessively proximate the dashboard. Moreover, since the contact portion 27 is not formed in the initial stage of airbag inflation, the raised regions 25L and 25R deploy in such a manner as to unfurl to the left and right. That is, in the initial stage of airbag deployment, an inflation gas entered from the gas inlet 18 flows to the left and right via the communication port 22, i.e., to the left and right raised regions 25L and 25R, so that the airbag 15 unfurls vertically and transversely but not toward an occupant as shown in FIGS. 17A and 17B. Since the airbag 15 of this specific embodiment is configured such that the contact portion 27 is formed proximate the upper edge 22b of the communication port 22, the airbag 15 initially inflates such that an upper area where the contact portion is to be formed stretches out to the left and right as if separating the raised regions 25L and 25R to the left and right, so that the raised regions 25L and 25R deploy widely and downwardly as shown in FIGS. 17B and 18A. Further, since the communication port 22 has a small diameter, the area around the communication port 22 has a relatively small projecting stroke in the initial stage of airbag inflation and therefore has a low pressing stroke against the occupant even in the event that the inflating airbag 15 engages an occupant seated excessively proximate the dashboard 1. As a result, the airbag 15 has a reduced risk of unduly pushing such occupant rearward coupled with the manner the airbag 15 unfurls widely in the vertical and transverse directions.

Figure 18B:
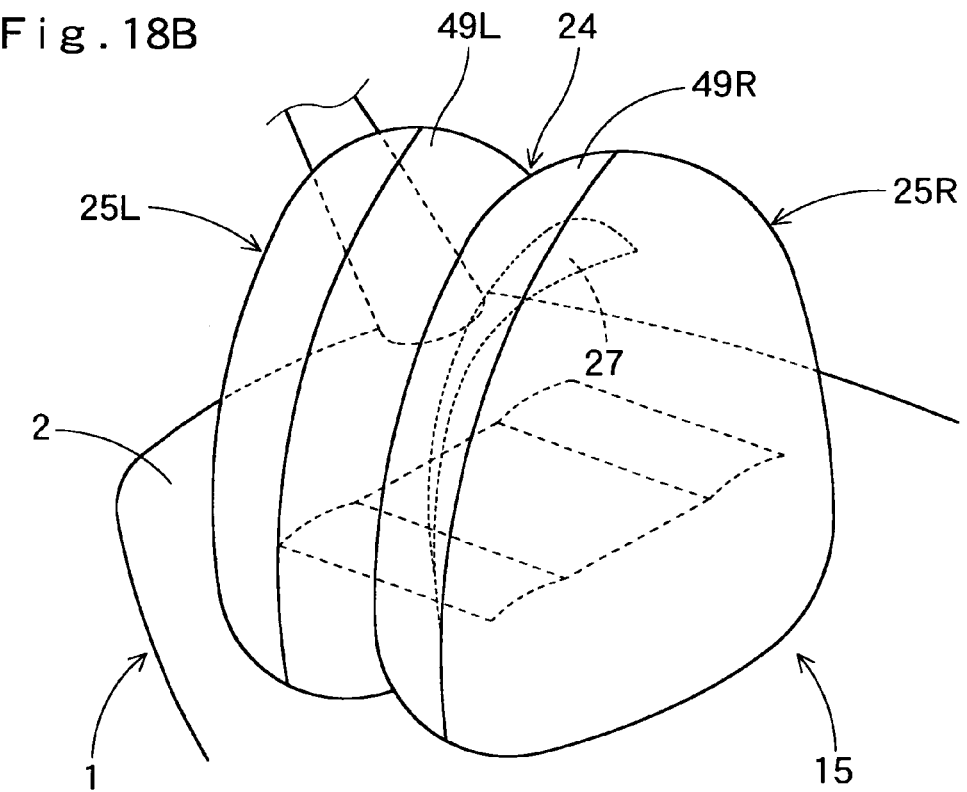

Since the airbag 15 is configured such that the contact portion 27 is created and maintained by the inner pressure of the airbag 15 at full inflation that acts on the panels of the airbag 15, i.e. the outer panels 36L and 36R and inner panels 49L and 49R, when the airbag 15 is used to protect an occupant MP seated at a normal position, the airbag 15 passes through the early stage of deployment where no contact portion 27 is formed as shown in FIG. 18A, and goes on to complete inflation with the outer surfaces of the inner panels 49L and 49R brought into face-to-face contact to form the contact portion 27 as shown in FIGS. 15, 16 and 18B. If the occupant MP is thrown against the airbag 15 having the contact portion 27, the raised regions 25L and 25R firstly receive left and right shoulders MSL and MSR of the occupant MP as shown in FIGS. 15 and 16, thereby reducing a kinetic energy of the occupant MP. Then the airbag 15 receives a head MH of the occupant MP softly by the recess 24 in such condition that his/her kinetic energy has been preliminarily reduced by the raised regions 25L and 25R.

Therefore, the airbag 15 embodying the invention, having a simple structure, inhibits the risk of applying an undue pressure to an occupant seated excessively proximate the dashboard 1 upon deployment while at the same time being capable of protecting an occupant seated in a normal position properly.

As described above, in the folding process, the airbag 15 is firstly formed into the preparatorily-folded airbag 68 which has the inner seam 60 extending vertically at the lateral center, and then is subjected to the horizontal folding that reduces the anteroposterior width forming the horizontal creases and then to the vertical folding that reduces the transverse width forming the creases extending anteroposteriorly. Especially during the vertical folding, left and right regions of the airbag 15 are brought close to the gas inlet 18 by bellows-folding. Accordingly, the bellows is unfolded in the early stage of airbag deployment, such that the airbag 15 unfurls widely in the transverse direction. Coupled with this folding method, the airbag 15 is further prevented from pressing an occupant sitting too proximate the dashboard 1.

In the airbag 15, moreover, the inner circumferential edges 51L and 51R of the inner panels 49L and 49R includes the straight portions 52L and 52R extending straightly, and therefore the contact potion 27 is formed into a generally crescentic shape that has the straight portion 60a of the inner seam 60 formed by sewing up the straight portions 52L and 52R as its chord. Accordingly a distance between the straight inner circumference of the contact portion 27 (or the straight portion 60a of the inner joint 60) and the curved outer circumference 27a (refer to double-dashed lines in FIG. 9) is enlarged, i.e., the contact portion 27 is configured deep. Therefore, the rearward projecting stroke of the area around the communication port 22 is further reduced in the initial stage of airbag deployment while at the same time the airbag 15 is able to complete inflation at a later stage having the contact portion 27 and making the raised regions 25L and 25R come close to each other so the raised regions 25L and 25 arrest shoulders MSL and MSR of the occupant MP securely. Without considering such an advantage, the inner circumferential edges of the inner panels may be designed to curve along the outer circumferential edges inside the base line for the inner circumference.

The inner panels 49L and 49R of the airbag 15 are configured such that the front end 51a of each of the inner circumferential edges 51L and 51R and the front end 50a of each of the outer circumferential edges 50L and 50R converge or coincide each other while at the same time the curvature of the outer circumferential edges 50L and 50R are generally congruent with that of the rear edges 43L and 43R of the outer panels 36L and 36R. With this configuration, as shown in FIG. 4, the bottom 24a of the recess 24, which is formed of the inner joint 60, and the tops 25a of the raised regions 25L and 25R, which are formed of the outer joints 64L and 64R that sew up the outer circumferential edges 50L and 5OR of the inner panels 49L and 49R and the rear edges 43L and 43R of the outer panels 36L and 36R, start from the same leading end indicated at 24b and 25b. Furthermore, since each of the straight portions 52L and 52R forming the inner circumference of the contact portion 27 extends rearward from the front end 52a that coincides with the front end 50a of each of the outer circumferential edges 50L and 50R, the leading end 27b of the contact potion 27 also comes to coincide with the leading ends 25b of the tops 25a of the raised regions 25L and 25R at full inflation of the airbag 15 (FIG. 4). As shown in FIG. 15, the leading end 27b of the contact potion 27 and the leading ends 25b of the tops 25a of the raised regions 25L and 25R are located proximate an area of the fully inflated airbag 15 that contacts the windshield 4, so that the contact portion 27 is formed on other area of the airbag 15 that is out of contact with the windshield 4. As a result, the contact portion 27 is formed in a stable manner without being affected by the windshield 4 or raised regions 25L and 25R.

Since the contact portion 27 of the airbag 15 is formed proximate the upper edge 22b of the communication port 22, the area around the communication port 22 is securely prevented from engaging a head of such an occupant as seated excessively proximate the dashboard upon airbag deployment. When protecting an occupant MP seated at normal position, if a head MH of such occupant MP enters into the recess obliquely downward from behind with shoulders MSL and MSR restrained by the raised regions 25L and 25R, the airbag 15 starts to arrest the head MH at the outer circumference 27a of the contact portion 27. As the head MH intrudes further into the recess 24, the contact portion 27 dissolves and allows the head MH to enter into the area of the contact portion 27 as indicated by double-dashed lines in FIG. 16. That is, the airbag 15 as fully inflated comes to have a substantially deepened recess 24, and therefore is able to protect the occupant's head MH further softly. Since the airbag 15 starts to arrest the head MH at the outer circumference 27a of the contact portion 27, i.e., at the base line for the inner circumference, although the depth of the recess 24 is great, the timing to arrest the head MH is not late in comparison with conventional airbags, thereby assuring proper protection of the head MH.

If such an advantage as above does not have to be considered, the airbag may be configured like an airbag 15C shown in FIG. 21. The airbag 15C is configured such that a contact portion 27C is formed proximate a lower edge (or a rear lower edge) 22c of the communication port 22C. The airbag 15C has a similar structure to the airbag 15 described above except in contours of an outer panel 78R (78L) and inner panel 82R (82L) and a contour at full inflation, and therefore, detailed descriptions of shared components will be omitted by adding a numeral "C" to each of reference numerals of those components. The airbag 15C is formed by sewing circumferential edges of the outer panels 78R (78L) and inner panels 82R (82L) shown in FIG. 22 together. Each of the outer panels 78R (78L) has such a contour that the outer panel 36R (36R) of the foregoing embodiment is generally turned upside down. Specifically, an upper region 79R (79L) for forming a right (left) area on the upper side wall is formed into such a generally triangular contour that is continuous with a central region 80R (80L) at the front end and projects partially rearward from the central region 80R (80L). The inner panel 82R (82L) is configured such that a lower end 83a of an outer circumferential edge 83R (83L) and a lower end 84a of an inner circumferential edge 84R (84L) coincide each other and the inner circumferential edge 84R (84L) includes a vertical straight portion 85R (85L) extending rearward and upward from the lower end 83a of the outer circumferential edge 83R (83L). The contact portion 27C is formed proximate the rear lower edge 22c of the communication port 22 into such a generally crescentic shape that has the vertical straight portion 85R (85L) as a chord thereof.

If the airbag 15C thus configured operates for example in the event that a child seat is mounted facing rearward on a front passenger's seat, the contact portion 27C of the fully inflated airbag 15C will dissolve and a head rest part of the child seat is admitted in between the recess 24 and the dashboard, so that the inflated airbag 15C will be prevented from engaging the child seat as much as possible. In the initial stage of deployment, the airbag 15C will inflate without forming the contact portion 27C in such a manner as to unfurl a rear lower area of the raised portions widely to the left and right, so that the airbag 15C will be inhibited from pressing the child seat rearward even if the head rest part of the child seat is positioned proximate the dashboard. In the event that not only a child seat but also other objects are located proximate the dashboard, too, the airbag will be prevented from engaging those objects at full inflation as much as possible.

The airbag may be configured like an airbag 15D shown in FIG. 23. The airbag 15D has a similar structure to the airbag 15C except in that an inner circumferential edge 84DR (84DL) of an inner panel 82DR (82DL) includes a curved portion 87R (87L) projecting inward relative to the vertical straight portion 85R (85L) of the inner panel 82R (82L) of the airbag 15C (as indicated by double-dashed lines in FIG. 24) and therefore a communication port 22D and a contact portion 27D have differing contours. Accordingly, detailed descriptions of shared components will be omitted by adding a numeral "D" to each of reference numerals of those components. Since the inner circumferential edge 84DR (84DL) of the inner panel 82DR (82DL) of the airbag 15D includes the curved portion 87R (87L) projecting toward a gas inlet 18D relative to the vertical straight portion 85R (85L) which is to form a chord against the outer circumference 27a of the contact portion 27D, the communication port 22D is formed into such a contour at full airbag inflation that an edge 22f between a rear upper edge 22d and a rear lower edge 22e partially projects forward as shown in FIG. 23 in comparison with that of the communication port 22C of the airbag 15C (dashed line in FIG. 23). The area of the contact portion 27D enlarges according to the projecting area 27d. Since the projecting area 27d shown in FIG. 23 projects forward relative to the vertical straight portion 85R (85L) which is to form a chord against the outer circumference 27a, the contact portion 27D will be created and maintained all during inflation process of the airbag 15D. However, it will dissolve when an object like a head rest of a child seat comes in a recess 24D, and therefore, the airbag 15D comes to have a further deepened recess 24D. If the airbag 15D operates in the event that a tall child seat is mounted facing rearward on a front passenger's seat, the contact portion 27D of the fully inflated airbag 15D will dissolve and a head rest part of the child seat is admitted in between the recess 24D and the dashboard, so that the inflated airbag 15D will be prevented from engaging the child seat. Although the partial projecting area 27d is formed proximate the lower edge of the communication port 27, it may be formed on such an airbag as the airbag 15 described above in which the contact portion is formed proximate the upper edge of the communication port.

Although the airbag 15 of the foregoing embodiment is manufactured by sewing up circumferential edges of the outer panels 36L and 36R and inner panels 49L and 49R with sewing yarn, means for coupling base cloths should not be limited thereby. For example, the airbag may be manufactured by joining the base cloths with adhesive or the like.

What it claimed is:

1. An airbag for a front passenger's seat mountable on a motor vehicle, the airbag being folded up and stored in a housing on a top area of an instrument panel in front of the front passenger's seat for deployment upward and rearward when fed with inflation gas in such a manner as to fill in a space between a top plane of the instrument panel and a windshield disposed above the instrument panel, the airbag having a generally square conical contour at inflation whose front end is the top of the square cone and comprising:

a pair of outer panels located on laterals of the inflated airbag;

a pair of inner panels located on an inner area in a transverse direction of the inflated airbag, each of the inner panels having a band contour curved in a generally C-shape as is flattened;

an inner joint that joins inner circumferential edges of the inner panels together;

a gas inlet for introducing inflation gas, at the vicinity of a lateral center of a front end of a lower side of the airbag at full inflation;

a communication port located at a center in a transverse direction of an interior of the airbag at full inflation, a circumferential edge of the communication port being defined by the inner joint;

a recess that recesses forward at a region corresponding to the circumferential edge of the communication port on at least a rear part of the airbag at full inflation;

two raised regions located on left and right of the recess, each of the raised regions extending generally vertically in such a manner as to rise rearward relative to the recess;

a contact portion where outer surfaces of the inner panels are in a face-to-face contact, wherein the contact portion is created and maintained proximate the circumferential edge of the communication port by an inner pressure of the airbag at full inflation that acts on the outer panels and inner panels and is not created if the inner pressure is less than that at full inflation of the airbag; and a generally straight portion provided at each of the inner circumferential edges of the inner panels that form an inner circumference of the contact portion, such that a shape of the contact portion is a crescent-shape, and the generally straight portion forms a chord of the crescent-shape.

2. The airbag for a front passenger's seat according to claim 1, wherein the contact portion is located proximate an upper part of the circumferential edge of the communication port.

3. The airbag for a front passenger's seat according to claim 2, wherein:

the outer panels are configured into such laterally symmetric separate entities that split up an area of the airbag as inflating except a rear part;

the airbag includes a joint that joins upper edges of the outer panels, the joint extending along an anteroposterior direction at a center in the transverse direction of an upper area of the airbag at full inflation;

the inner panels are configured such that a front end of each of the inner circumferential edges thereof and a front end of each of the outer circumferential edges thereof coincide each other while at the same time a curvature of the outer circumferential edges thereof is generally congruent with a curvature of the outer circumferential edges of the outer panels;

each of the inner circumferential edges of the inner panels that form an inner circumference of the contact portion includes a straight portion; and each of the straight portions extends rearward from the front end of each of the inner circumferential edges.

4. The airbag for a front passenger's seat according to claim 1, wherein the contact portion is located proximate a lower part of the circumferential edge of the communication port.

5. An airbag for a front passenger's seat mountable on a motor vehicle, the airbag being folded up and stored in a housing on a top area of an instrument panel in front of the front passenger's seat for deployment upward and rearward when fed with inflation gas in such a manner as to fill in a space between a top plane of the instrument panel and a windshield disposed above the instrument panel, the airbag having a generally square conical contour at inflation whose front end is the top of the square cone and comprising:

a pair of outer panels located on laterals of the inflated airbag;

a pair of inner panels located on an inner area in a transverse direction of the inflated airbag, each of the inner panels having a band contour curved in a generally C-shape as is flattened;

an inner joint that joins inner circumferential edges of the inner panels together;

a gas inlet for introducing inflation gas, at the vicinity of a lateral center of a front end of a lower side of the airbag at full inflation;

a communication port located at a center in a transverse direction of an interior of the airbag at full inflation, a circumferential edge of the communication port being defined by the inner joint;

a recess that recesses forward at a region corresponding to the circumferential edge of the communication port on at least a rear part of the airbag at full inflation;

two raised regions located on left and right of the recess, each of the raised regions extending generally vertically in such a manner as to rise rearward relative to the recess;

a contact portion where outer surfaces of the inner panels are in a face-to-face contact, wherein the contact portion is created and maintained proximate the circumferential edge of the communication port by an inner pressure of the airbag at full inflation that acts on the outer panels and inner panels and is not created if the inner pressure is less than that at full inflation of the airbag;

an outer circumference of the contact portion so curves that a center thereof projects rearward at full inflation of the airbag; and each of the inner circumferential edges of the inner panels that form an inner circumference of the contact portion includes a curved portion that projects toward the gas inlet at full inflation of the airbag relative to a hypothetical chord connecting opposite ends of the outer circumference of the contact portion.

6. The airbag for a front passenger's seat according to claim 1, wherein the contact portion is configured by two crescent-shaped areas on the outer surfaces of the inner panels.

7. The airbag for a front passenger's seat according to claim 6, wherein the crescent-shaped areas are each tapered from a middle to a generally upper end and from the middle to a generally lower end.

* * * * *